(12) United States Patent
Zhang et al.

(10) Patent No.: US 11,297,614 B2
(45) Date of Patent: Apr. 5, 2022

(54) COLLISION AVOIDANCE FOR UPLINK RADIO RESOURCE ALLOCATION IN REOCCURRING TIME INTERVALS

(71) Applicant: Telefonaktiebolaget LM Ericsson (publ), Stockholm (SE)

(72) Inventors: Hanzhi Zhang, Munich (DE); Torsten Dudda, Aachen (DE); Per Synnergren, Gammelstad (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 793 days.

(21) Appl. No.: 15/503,068

(22) PCT Filed: Sep. 1, 2014

(86) PCT No.: PCT/EP2014/068512
§ 371 (c)(1),
(2) Date: Feb. 10, 2017

(87) PCT Pub. No.: WO2016/034196
PCT Pub. Date: Mar. 10, 2016

(65) Prior Publication Data
US 2017/0238314 A1    Aug. 17, 2017

(51) Int. Cl.
*H04W 72/04* (2009.01)
*H04W 72/14* (2009.01)

(52) U.S. Cl.
CPC ..... *H04W 72/0446* (2013.01); *H04W 72/042* (2013.01); *H04W 72/0406* (2013.01); *H04W 72/14* (2013.01)

(58) Field of Classification Search
CPC ............... H04W 72/042; H04W 72/14; H04W 72/0406; H04W 72/0446
See application file for complete search history.

(56) References Cited

U.S. PATENT DOCUMENTS 10,129,905 B2 * 11/2018 Dudda .............. H04W 72/1268
10,986,662 B2 *  4/2021 Dudda .................. H04W 72/04
(Continued)

FOREIGN PATENT DOCUMENTS

EP          1973358 A1     9/2008

OTHER PUBLICATIONS

3rd Generation Partnership Project; "Technical Specification Group Radio Access Network; Evolved Universal Terrestrial Radio Access (E-UTRA); Medium Access Control (MAC) protocol specification (Release 12)" Technical Specification; Jun. 2014; pp. 1-57; 3GPP TS 36.321 V12.2.1; Sophia Antipolis, Valbonne, France.

*Primary Examiner* — Mandish K Randhawa
(74) *Attorney, Agent, or Firm* — Sage Patent Group

(57) ABSTRACT

A node (100) of a cellular network sends an uplink grant (803) to a communication device (10). The uplink grant indicates uplink radio resources allocated to the communication device (10) in reoccurring time intervals. In response to detecting a need for an uplink retransmission (814) by a further communication device (10') on at least a part of the allocated uplink radio resources in a certain one of the time intervals, the node (100) sends control information (808) to the communication device (10). The control information (808) temporarily disables utilization of at least this part of the allocated uplink radio resources in at least this certain time interval by the communication device (10).

32 Claims, 15 Drawing Sheets

(56) References Cited

U.S. PATENT DOCUMENTS

| | | | |
|---|---|---|---|
| 11,166,263 B2* | 11/2021 | Zhang | H04W 72/1268 |
| 2006/0291393 A1 | 12/2006 | Teague et al. | |
| 2007/0066273 A1* | 3/2007 | Laroia | H04W 52/0235 |
| | | | 455/343.2 |
| 2009/0070650 A1 | 3/2009 | Bourlas et al. | |
| 2012/0069805 A1* | 3/2012 | Feuersanger | H04W 72/1284 |
| | | | 370/329 |
| 2013/0029651 A1* | 1/2013 | Martin | H04W 52/0229 |
| | | | 455/418 |
| 2014/0177487 A1 | 6/2014 | Hammarwall et al. | |

* cited by examiner

| 4 | 5 | 6 | 7 | 8 | 9 | 10 | 11 | 12 | 13 |
|---|---|---|---|---|---|---|---|---|---|
| IUA-RB UE2 | IUA-RB UE2 | IUA-RB UE2 | IUA-RB UE2 | IUA-RB UE2 | IUA-RB UE2 | IUA-RB UE2 | IUA-RB UE2 | IUA-RB UE2 | IUA-RB UE2 |
| D-RB UE2 (TX) | | IUA-RB UE1 | IUA-RB UE1 | IUA-RB UE1 | IUA-RB UE1 | IUA-RB UE1 | IUA-RB UE1 | D-RB UE2 (RTX) | IUA-RB UE1 |

FIG. 9

| 4 | 5 | 6 | 7 | 8 | 9 | 10 | 11 | 12 | 13 |
|---|---|---|---|---|---|---|---|---|---|
| IUA-RB UE2 (TX) | IUA-RB UE2 | IUA-RB UE2 + UE1 | IUA-RB UE2 + UE1 | IUA-RB UE2 + UE1 | IUA-RB UE2 + UE1 | IUA-RB UE2 + UE1 | IUA-RB UE2 + UE1 | IUA-RB UE2 (RTX) | IUA-RB UE2 + UE1 |

FIG. 10

COLLISION AVOIDANCE FOR UPLINK RADIO RESOURCE ALLOCATION IN REOCCURRING TIME INTERVALS

TECHNICAL FIELD

The present invention relates to methods for controlling radio transmission in a cellular network and to corresponding devices.

BACKGROUND

In cellular networks, allocation of radio resources to a certain user equipment (UE), also referred to as scheduling, is typically accomplished dynamically on the network side. In the downlink (DL) direction from the cellular network to the UE, a network node may allocate radio resources in accordance with a need to transmit DL data to the UE. The network node may then inform the UE about the allocated resources by sending a DL assignment. For the uplink (UL) direction from the UE to the cellular network, a scheduling request which is sent by the UE to the cellular network may be used to indicate that the UE needs radio resources for sending UL data. For example, in the LTE (Long Term Evolution) radio access technology specified by 3GPP ($3^{rd}$ Generation Partnership Project), a base station of the LTE radio access technology, referred to as "evolved Node B" (eNB) is responsible for the scheduling. This may be accomplished dynamically, taking into account the instantaneous traffic pattern and radio propagation characteristics of each UE.

In the dynamic scheduling process of the LTE radio access technology a UE which needs to send UL data may first send a scheduling request to an eNB which serves the cell of the UE. The scheduling request may be sent on a UL control channel, referred to as PUCCH (Physical UL Control Channel), providing dedicated resources for sending scheduling requests by the UE. Alternatively, the scheduling request may be sent on a contention based random access channel (RACH). The eNB then allocates UL radio resources to the UE. The allocated UL radio resources are indicated in a UL grant, which is sent from the eNB to the UE. A separate UL grant is sent for each subframe or TTI (Transmission Time Interval) of 1 ms. On the allocated UL radio resources, the UE may then send UL data to the eNB. In addition, the UE may also send a buffer status report (BSR) indicating the amount of buffered UL data still to be sent by the UE.

In the above process of transmitting the UL data, latency occurs which is due to the sending of the scheduling request before the UE can proceed with the transmission of the UL data. However, such delay is not desirable in many cases. For example, certain data traffic may be sensitive to latency, such as data traffic associated with online gaming.

A technology which may be used for achieving a reduced latency is Semi-Persistent Scheduling (SPS) as specified in 3GPP TS 36.321 V12.2.1 (June 2014). In SPS, UL radio resources are periodically allocated to the UE by sending a long lasting grant which covers multiple TTIs by allocating UL radio resources in a pattern of TTIs with configurable periodicity. By utilizing SPS, the need to send scheduling requests may be reduced.

However, the utilization of such long lasting grants may result in a risk of colliding transmissions on the same radio resources. For example, in the LTE radio access technology retransmissions according to a HARQ (Hybrid Automatic Repeat Request) protocol are typically performed on the same radio resources as the original transmission, however eight TTIs later. Accordingly, although an UL grant is issued with respect to a specific TTI, it may have an impact on later TTIs. The problem may be illustrated by the following scenario: A first UE performs an UL transmission on UL radio resources allocated by a conventional UL grant in a certain TTI. In one of the next TTIs, the eNB allocates these UL radio resources by a long lasting grant to another UE. After providing the long lasting grant to the second UE, the eNB detects failure of the UL transmission and sends a HARQ NACK (negative acknowledgement) to the first UE to trigger a retransmission by the first UE. This retransmission is typically performed on the same UL radio resources as the original UL transmission, eight TTIs later than the original UL transmission. Since the UL radio resources have in the meantime been allocated to the second UE by the long lasting grant, a collision of the retransmission by the first UE and an UL transmission by the second UE may happen.

One possibility to avoid such collisions is to allocate only those UL radio resources for which no retransmission is expected. However, in the case of an allocation by a long lasting grant, such selection of radio resources may be limited by the availability of radio resources, specifically because the long lasting grant may be issued at a time when it is not yet known in which of the available radio resources a retransmission will actually happen.

Accordingly, there is a need for techniques which allow for efficiently controlling radio transmissions in a cellular network, in particular with respect to avoiding collisions of UL transmissions or retransmissions on UL radio resources allocated by a long lasting grant.

SUMMARY

According to an embodiment of the invention, a method of controlling radio transmission in a cellular network is provided. According to the method, a node of the cellular network sends a UL grant to a communication device. The UL grant indicates UL radio resources allocated to the communication device in reoccurring time intervals. In response to detecting a need for a UL retransmission by a further communication device on at least a part of the allocated UL radio resources in a certain one of the time intervals, the node sends control information to the communication device. The control information temporarily disables utilization of at least this part of the allocated UL radio resources in at least this certain time interval by the communication device.

According to a further embodiment of the invention, a method of controlling radio transmission in a cellular network is provided. According to the method, a communication device receives a UL grant from the cellular network. The UL grant indicates UL radio resources allocated to the communication device in reoccurring time intervals. After receiving the UL grant, the communication device receives control information from the cellular network. In response to the control information, the communication device temporarily disables utilization of at least a part of the allocated UL radio resources in at least one of the time intervals by the communication device.

According to a further embodiment of the invention, a node for a cellular network is provided. The node comprises an interface for connecting to a communication device and to a further communication device. Further, the node comprises at least one processor. The at least one processor is configured to send a UL grant to the communication device. The UL grant indicates UL radio resources allocated to the communication device in reoccurring time intervals. Further, the at least one processor is configured to, in response to detecting a need for a UL retransmission by the further communication device on at least a part of the allocated UL radio resources in a certain one of the time intervals, send control information to the communication device. The control information temporarily disables utilization of at least this part of the allocated UL radio resources in at least this certain time interval by the communication device.

According to a further embodiment of the invention, a communication device is provided. The communication device comprises an interface for connecting to a cellular network. Further, the communication device comprises at least one processor. The at least one processor is configured to receive a UL grant from the cellular network. The UL grant indicates UL radio resources allocated to the communication device in reoccurring time intervals. Further, the at least one processor is configured to, after receiving the UL grant, receive control information from the cellular network and, in response to the control information, temporarily disable utilization of at least a part of the allocated UL radio resources in at least one of the time intervals by the communication device.

According to a further embodiment of the invention, a computer program or computer program product is provided, e.g., in the form of a non-transitory storage medium, which comprises program code to be executed by at least one processor of a node of a cellular network. Execution of the program code causes the at least one processor to send a UL grant to a communication device. The UL grant indicates UL radio resources allocated to the communication device in reoccurring time intervals. Further, execution of the program code causes the at least one processor to, in response to detecting a need for a UL retransmission by the further communication device on at least a part of the allocated UL radio resources in a certain one of the time intervals, send control information to the communication device. The control information temporarily disables utilization of at least this part of the allocated UL radio resources in at least this certain time interval by the communication device.

According to a further embodiment of the invention, a computer program or computer program product is provided, e.g., in the form of a non-transitory storage medium, which comprises program code to be executed by at least one processor of a communication device. Execution of the program code causes the at least one processor to receive a UL grant from a cellular network. The UL grant indicates UL radio resources allocated to the communication device in reoccurring time intervals. Further, execution of the program code causes the at least one processor to, after receiving the UL grant, receive control information from the cellular network and, in response to the control information, temporarily disable utilization of at least a part of the allocated UL radio resources in at least one of the time intervals by the communication device.

Details of such embodiments and further embodiments will be apparent from the following detailed description of embodiments. dr

BRIEF DESCRIPTION OF THE DRAWINGS

FIG. 9 schematically illustrates an allocation of UL radio resources in the processes of FIG. 8.

FIG. 10 schematically illustrates a further example of allocation of UL radio resources in processes according to an embodiment of the invention.

DETAILED DESCRIPTION OF EMBODIMENTS

Figure 1:
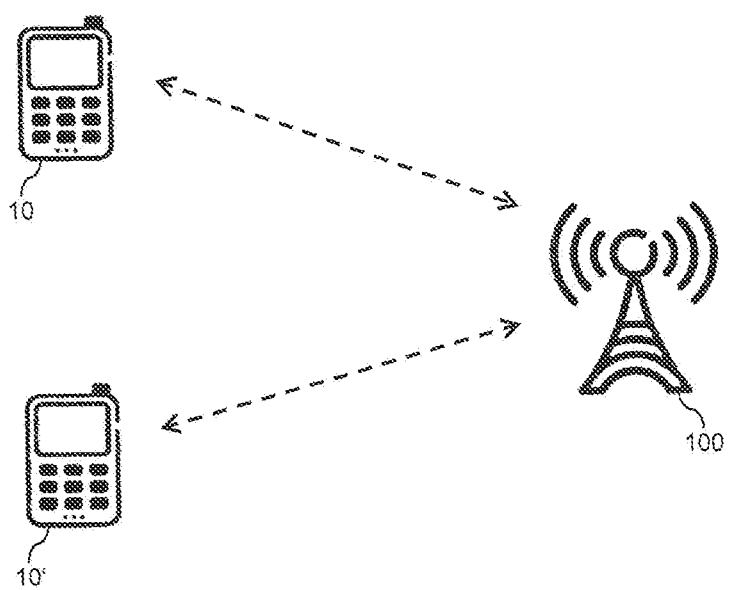
FIG. 1 schematically illustrates an exemplary cellular network environment with elements which may be involved in controlling UL transmissions according to an embodiment of the invention.

In the following, concepts in accordance with exemplary embodiments of the invention will be explained in more detail and with reference to the accompanying drawings. The illustrated embodiments relate to concepts for controlling radio transmission in a cellular network. The embodiments specifically refer to a scenario using LTE radio access technology. However, it should be understood that the concepts could also be applied in connection with other radio access technologies, e.g., Universal Mobile Telecommunications System (UMTS) radio access technology.

According to the illustrated concepts, UL transmissions from a communication device to the cellular network are performed on UL radio resources which may be allocated by two types of UL grants: first UL grants, in the following referred to as IUA-UL grant (IUA: Instant UL Access), which each indicate radio resources allocated to the communication device in reoccurring time intervals, and second UL grants, in the following referred to as dynamic UL grant (D-UL grant), which each indicate UL radio resources allocated to the communication device on a one time basis. The radio transmissions may be organized in radio frames each formed of a sequence of subframes, and the above-mentioned time intervals may correspond to the individual subframes. For example, in the LTE radio access technology the time intervals may correspond to TTIs or subframes of 1 ms duration. The IUA-UL grant may be provided to the communication device in preparation of a future UL transmission by the communication device, without any indication of a specific need to transmit UL data by the communication device. As compared to that, the D-UL grants are provided to the communication device in a dynamic manner, in particular on an as-needed basis. For example, a D-UL grant may be sent in response to a scheduling request by the communication device or in response to a BSR from the communication device. The IUA-UL grant and the D-UL grants may be sent on a DL control channel, such as a PDCCH (Physical DL control channel) of the LTE radio access technology. By means of the IUA-UL grants, a low latency associated with a UL transmission by the communication device may be provided. Specifically, on the UL radio resources indicated by the IUA-UL grant, the communication device may perform the UL transmission without previously indicating to the cellular network that there is a need to transmit UL data, e.g., by sending a scheduling request. Rather, the UL data can be transmitted in the next one of the reoccurring time intervals.

In the illustrated concepts, the allocated UL radio resources indicated by the IUA-UL grant may be utilized in a conditional manner. Specifically, for each of the time intervals the communication device may select between an active mode and an inactive mode. In the active mode, the communication device performs a UL transmission on the allocated UL radio resources indicated by the IUA-UL grant. Conditions triggering the selection of the active mode may be a need to send UL data by the communication device or a need to send a BSR by the communication device. In the inactive mode, the communication device performs no UL transmission on the allocated UL radio resources indicated by the IUA-UL grant. The cellular network expects this behavior of the communication device and correspondingly selects between the active mode and the inactive mode. Specifically, the cellular network may detect that the communication device performed a UL transmission on the UL radio resources indicated by the IUA-UL grant and select the active mode to receive the UL transmission. If the UL transmission is received successfully, the cellular network may acknowledge this by sending a positive acknowledgement (ACK) to the communication device. If the UL transmission not received successfully, the cellular network may notify this by sending a negative acknowledgement (NACK) to the communication device. For example, sending of such ACKs or NACKs may be performed on the basis of a HARQ protocol, e.g., as defined for the LTE radio access technology. Further, the cellular network may detect that the communication device performed a UL transmission on the UL radio resources indicated by the IUA-UL grant and select the inactive mode. In the latter case, the cellular network may refrain from attempting to receive any UL transmission on the UL radio resources indicated by the IUA-UL grant or taking any further action concerning such UL transmission, e.g., sending of acknowledgements.

By the conditional utilization of the UL radio resources indicated by the IUA-UL grant, it can be avoided that the communication device needs to perform a UL transmission in each time interval with UL radio resources allocated by the IUA-UL grant, which allows for energy efficient operation of the communication device and may also avoid unnecessary interference due to the UL transmissions on the UL radio resources indicated by the IUA-UL grant.

FIG. 1 illustrates exemplary elements which may be involved in implementing a corresponding control of a UL scheduling process. As examples of communication device which may connect to the cellular network, FIG. 1 illustrates UEs 10, 10'. The UEs 10, 10' may each correspond to a mobile phone, a smartphone, a computer with wireless connectivity, or the like. As an example of a node of the cellular network which is responsible for controlling radio transmission by the UEs 10, 10', FIG. 1 illustrates a base station 100. In accordance with the assumed utilization of the LTE radio access technology, the base station 100 will in the following also be referred to as eNB. The eNB 100 is assumed to be responsible for performing the scheduling of UL transmissions, in particular providing the IUA-UL grants and providing the D-UL grants to the UEs 10, 10'.

It is to be understood that also other nodes may be involved in controlling at least a part of the UL scheduling process. For example, when utilizing the UMTS radio access technology, a control node referred to as RNC (Radio Network Controller) could implement similar functionalities as explained for the eNB 100.

Figure 2:
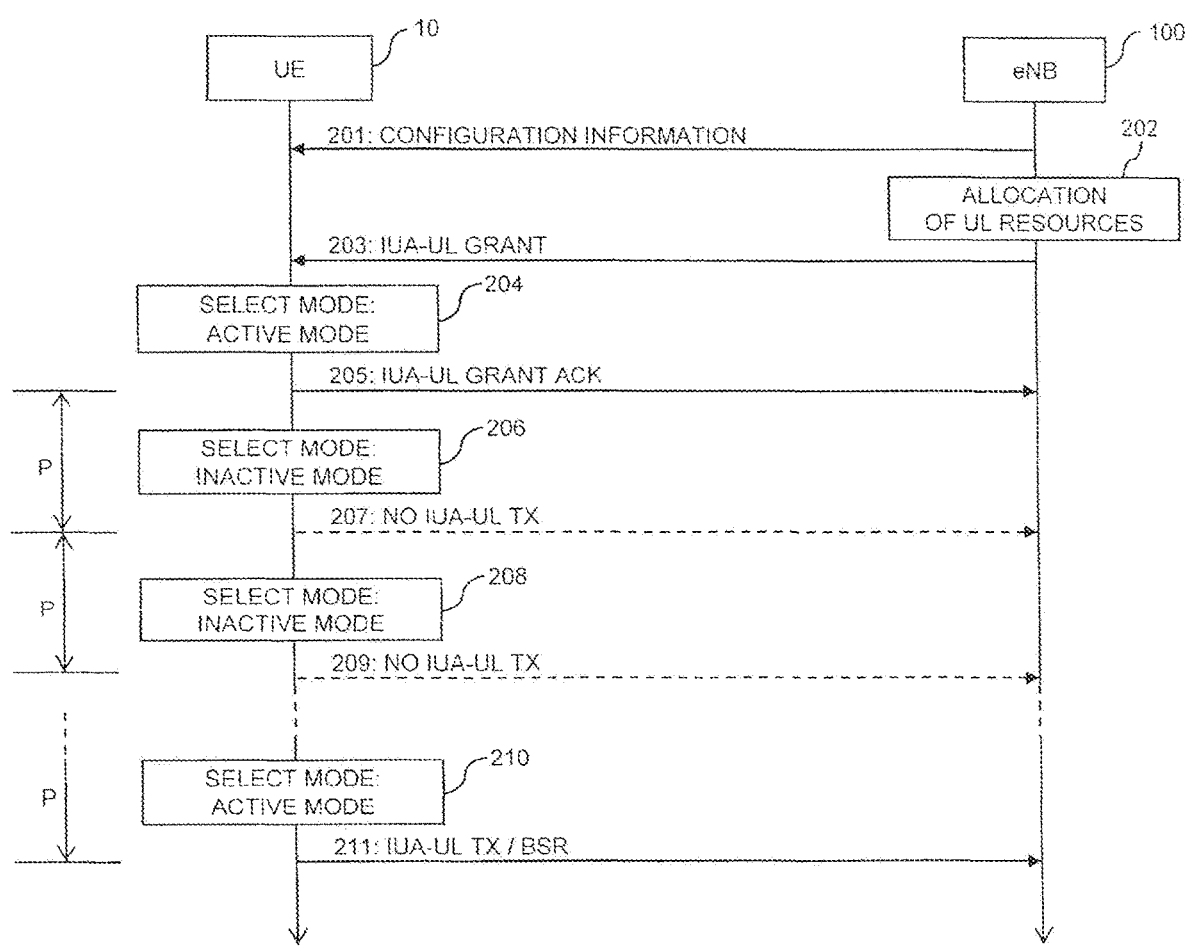
FIG. 2 schematically illustrates an exemplary process for performing UL radio transmissions according to an embodiment of the invention.

FIG. 2 shows an exemplary processes of performing UL transmissions on the basis of the IUA-UL grant. The processes of FIG. 2 involve the UE 10 and the eNB 100. However, it is to be understood that similar processes could also involve the UE 10' and the eNB 100.

As illustrated, the eNB 100 may send configuration information 201 to the UE 10. The configuration information 201 may for example indicate radio resources of a UL control channel which are allocated to the UE 10, e.g., radio resources of a PUCCH (Physical UL Control Channel). Further, the configuration information 201 could also provide various other kinds of information for establishing connectivity between the UE 10 and the eNB 100. The configuration information 201 may also indicate a configuration to be utilized by the UE 10 for various kinds of reporting to the cellular network, e.g., reporting of Channel State Information (CSI) or conditions for triggering a BSR. The configuration information 201 may for example be sent in an RRC (Radio Resource Control) message or by some other form of control signaling, e.g., in an MIB (Master Information Block) or SIB (System Information Block).

At step 202, the eNB 100 may allocate UL radio resources to the UE 10. Specifically, the eNB 100 allocates these UL radio resources in reoccurring time intervals to the UE 10, e.g., in each subframe or in some other predefined sequence of subframes, such as in every second subframe, every third subframe, every fourth subframe, or the like. These UL radio resources may be radio resources of a PUSCH (Physical UL Shared Channel).

The eNB 100 then sends an IUA-UL grant 203 to the UE 10. The IUA-UL grant 203 may be sent on the PDCCH. The IUA-UL grant 203 indicates the UL radio resources allocated at step 202. For example, the allocated UL radio resources may be indicated in terms of one or more resource blocks (RBs). Further, the IUA-UL grant 203 may also indicate a periodicity in which the allocated UL radio resources reoccur. Alternatively, such periodicity could also be indicated by separate control information, e.g., the control information 201. In FIG. 2, the periodicity in which the allocated UL radio resources reoccur is indicated by P, corresponding to a time offset between two time intervals with UL radio resources allocated by the IUA-UL grant. In the following this time interval is also referred to as IUA period.

The IUA-UL grant 203 may be provided with an indicator which allows the UE 10 to distinguish the IUA-UL grant 203 from other types of grants, e.g., a D-UL grant. Such indicator may for example be included in an information field of the IUA-UL grant 203. Further, the indicator could also be provided by utilizing a specific identifier to address the IUA-UL grant to the UE 10, e.g., a specific C-RNTI (Cell Radio Network Temporary Identity). For example, a one C-RNTI could be provided for addressing IUA-UL grants to the UE 10, and one or more other C-RNTIs could be provided for addressing other types of IUA-UL grants to the UE 10, such as D-UL grants.

After receiving the IUA-UL grant 203, the UE 10 may enter an IUA operation, in which the UL radio resources indicated by the IUA UL grant 203 may be instantly utilized for performing low latency UL transmissions. In the IUA operation, the UE 10 checks for each of the time intervals with the allocated UL resources whether a condition for selecting the active mode is met. If this is the case, the UE 10 selects the active mode and performs a UL transmission on the allocated UL radio resources. If this is not the case, the UE 10 selects the inactive mode and performs no transmission on the allocated UL radio resources.

As illustrated by step 204, in the first time interval with allocated UL resources indicated by the IUA-UL grant 203, the UE 10 may select the active mode to perform a UL transmission on the allocated resources which includes an acknowledgement (IUA-UL grant ACK) 205 of receipt of the IUA-UL grant 203 by the UE 10. The IUA-UL grant acknowledgement 205 may confirm to the eNB 100 that the UE 10 entered the IUA operation, which for example means that the eNB 100 should expect a UL transmission on the UL radio resources indicated by the IUA-UL grant 203. The IUA-UL grant acknowledgement 205 may for example correspond to a IUA-UL transmission with padding, i.e., without actual UL data but a predefined or random data pattern, such as only zeros.

As further illustrated by steps 206 and 208, in some time intervals with allocated UL radio resources indicated by the IUA-UL grant 203, the UE 10 may select the inactive mode. In this case, the UE 10 performs no UL transmission on the allocated UL radio resources indicated by the IUA-UL grant (no IUA-UL TX), as indicated by the dashed arrows 207 and 209.

As further illustrated by step 210, in some time intervals with allocated UL radio resources indicated by the IUA-UL grant 203, the UE 10 may select the active mode to perform a UL transmission on the allocated UL radio resources indicated by the IUA-UL grant (IUA-UL TX) 211. Selecting the active mode at step 210 may for example be triggered by a need for transmission of UL data by the UE 10. In such case, the IUA-UL transmission 211 may include at least a part of this UL data and a BSR. Selecting the active mode at step 210 could also be triggered by a need to send a BSR by the UE 10, without a need for transmission of UL data. In such case, the IUA-UL transmission 211 may include the BSR, but no UL data.

Figure 3:
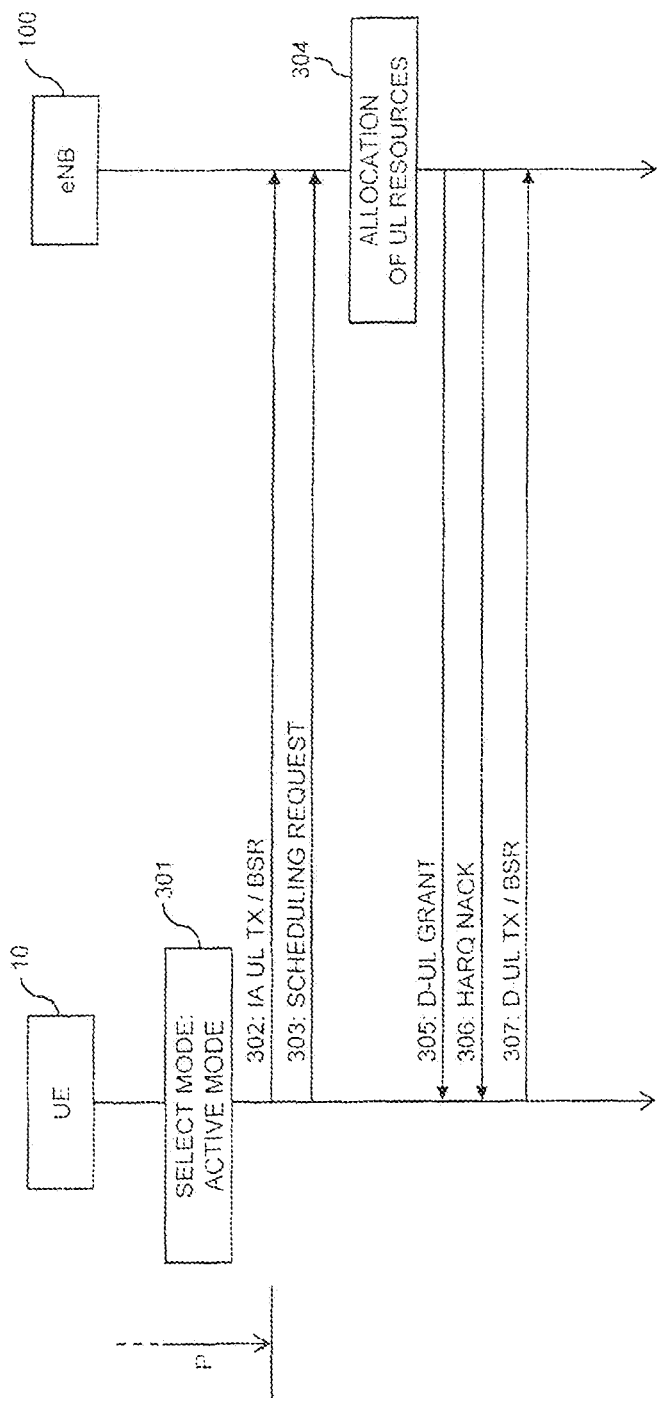
FIG. 3 schematically illustrates further exemplary process for performing UL radio transmissions according to an embodiment of the invention.

FIG. 3 shows further exemplary processes of performing UL transmissions on the basis of the IUA-UL grant. Also the processes of FIG. 3 involve the UE 10 and the eNB 100. The processes of FIG. 3 may for example be performed in the IUA operation of the UE 10, after receiving the IUA-UL grant.

As indicated by step 301, in a certain time interval with allocated UL radio resources indicated by the IUA-UL grant, the UE 10 may select the active mode to perform a UL transmission of UL data on the allocated UL radio resources indicated by the IUA-UL grant, in FIG. 3 illustrated by IUA-UL transmission 302 (which may also include a BSR).

In addition to sending the IUA-UL transmission 302, the UE 10 may also send a scheduling request 303 to the eNB 100.

As indicated by step 304, in response to the scheduling request 303 the eNB 100 performs allocation of further UL radio resources 304 to the UE 10. The eNB 100 sends a D-UL grant 305 to the UE 10 which indicates these further allocated UL radio resources.

In the processes of FIG. 3, it is further assumed that the IUA-UL transmission 302 could not be successfully received by the eNB 100, e.g., due to poor radio link adaptation between the UE 10 and the eNB 100. Accordingly, the eNB 100 notifies the UE 10 of the failed reception by sending a HARQ NACK 306.

The HARQ NACK 306 causes the UE 10 to retransmit the UL data on the further allocated UL radio resources indicated by the D-UL grant 305, as indicated by dynamic UL transmission (D-UL TX) 307. Similar to IUA-UL transmission 302, also the D-UL transmission 307 may include a BSR.

In the processes of FIG. 3, sending the scheduling request 305 together with the initial IUA-UL transmission 302 allows for avoiding additional delays if the IUA-UL transmission fails, i.e., for achieving a similar performance with respect to latency as in the case of utilizing only scheduling request based dynamic scheduling.

Figure 4:
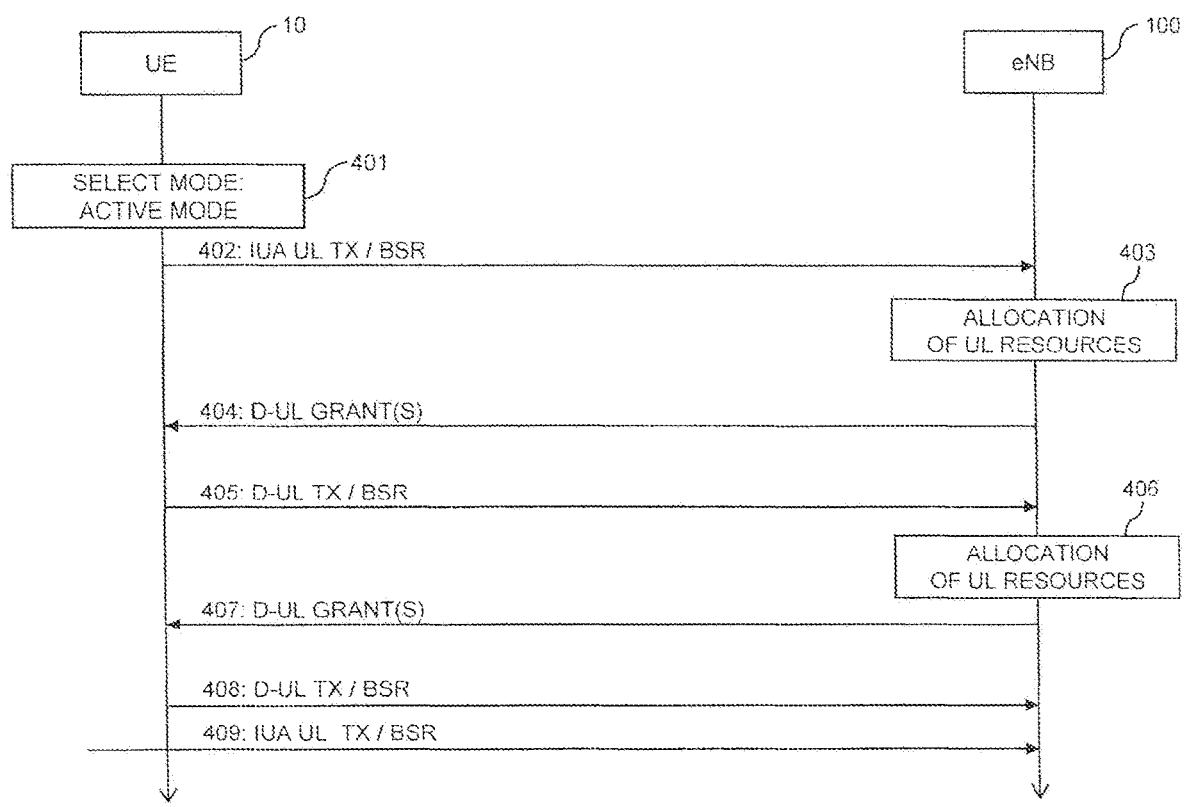
FIG. 4 schematically illustrates further exemplary process for performing UL radio transmissions according to an embodiment of the invention.

FIG. 4 shows further exemplary processes of performing UL transmissions on the basis of the IUA-UL grant. Also the processes of FIG. 4 involve the UE 10 and the eNB 100. The processes of FIG. 4 may for example be performed in the IUA operation of the UE 10, after receiving the IUA-UL grant.

As indicated by step 401, in a certain time interval with allocated UL radio resources indicated by the IUA-UL grant, the UE 10 may select the active mode to perform a UL transmission of UL data on the allocated UL radio resources indicated by the IUA-UL grant, in FIG. 4 illustrated by IUA-UL transmission 402. As illustrated, the IUA-UL transmission 402 also includes a BSR. The BSR indicates an amount of further UL data pending for transmission by the UE 10.

As indicated by step 403, on the basis of the BSR in IUA-UL transmission 402, the eNB 100 performs allocation of further UL radio resources to the UE 10. The eNB 100 sends a D-UL grant 404 to the UE 10 which indicates these further allocated UL radio resources.

The UE 10 may then transmit at least a part of the further UL data on the further allocated UL radio resources indicated by the D-UL grant 404, as indicated by D-UL transmission 405. Also D-UL transmission 405 includes a BSR which indicates an amount of further UL data pending for transmission by the UE 10.

As indicated by step 406, on the basis of the BSR in D-UL transmission 405, the eNB 100 performs allocation of further UL radio resources to the UE 10. The eNB 100 sends a further D-UL grant 407 to the UE 10 which indicates these further allocated UL radio resources.

The UE 10 may then transmit at least a part of the further UL data on the further allocated UL radio resources indicated by the D-UL grant 407, as indicated by D-UL transmission 408. Again, D-UL transmission 408 includes a BSR which indicates an amount of further UL data pending for transmission by the UE 10.

As further illustrated, the UE 10 may also perform a further IUA-UL transmission 409 at the later time interval with allocated UL radio resources indicated by the IUA-UL grant. Again, IUA-UL transmission 409 includes a BSR which indicates an amount of further UL data pending for transmission by the UE 10.

As can be seen from the processes of FIG. 4, the BSR in a IUA-UL transmission may trigger allocation of further UL radio resources which may then be indicated in a D-UL grant. These further allocated UL radio resources may then be used alternatively or in addition to the UL radio resources indicated by the IUA-UL grant for transmission of UL data. In this way, the amount of UL radio resources allocated to the UE 10 may be dynamically adapted to the current UL traffic demand of the UE 10, while at the same time allowing fast initial access to UL radio resources.

Figure 5:
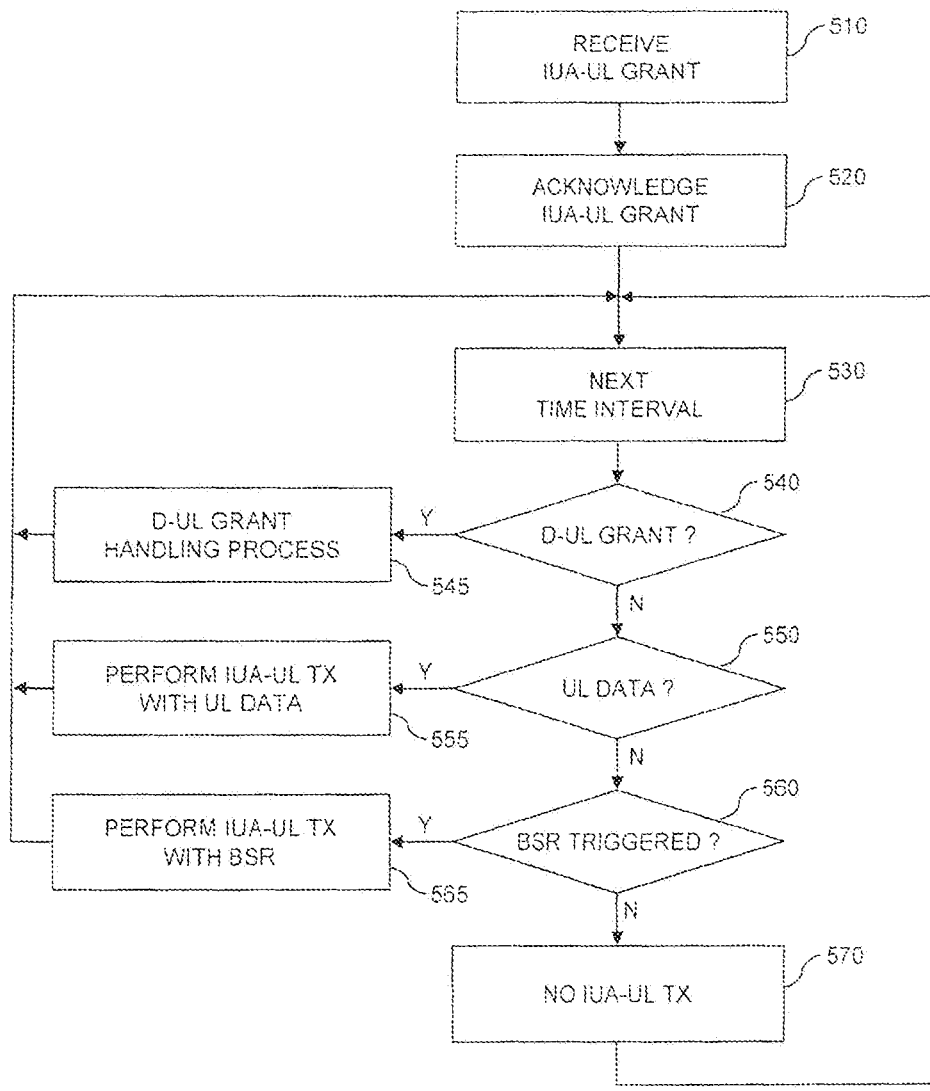
FIG. 5 shows a flowchart for illustrating a method according to an embodiment of the invention, which may be implemented by a communication device.

FIG. 5 shows a flowchart for illustrating a method which may be utilized for controlling a communication device, e.g., the UE 10, to operate in accordance with the above-mentioned concepts. If a processor based implementation of the communication device is used, the steps of the method may be performed by one or more processors of the communication device. For this purpose, the processor(s) may execute correspondingly configured program code. Further, at least some of the corresponding functionalities may be hardwired in the processor(s).

At step 510, the communication device receives the IUA-UL grant. The communication device may receive the IUA-UL grant on a DL control channel, e.g., on the PDCCH of the LTE radio access technology. The IUA-grant indicates UL radio resources allocated to the communication device in reoccurring time intervals, e.g., corresponding to a periodic pattern of subframes.

As indicated by step 520, the communication device may then acknowledge receipt of the IUA-UL grant, e.g., by performing a UL transmission filled by padding on the allocated UL radio resources indicated in the IUA-UL grant.

The communication device may then enter the IUA operation and perform the following actions when reaching a next time interval with allocated UL radio resources indicated in the IUA-UL grant, as indicated by step 530.

At step 540, the communication device may check if a D-UL grant was received by the communication device. If this is the case, the utilization of the D-UL grant may be prioritized over the utilization of the IUA-UL grant, corresponding to an overriding of the IUA-UL grant with the D-UL grant, and the method may proceed with step 545, as indicated by branch "Y".

At step 545, further UL radio resources indicated by the D-UL grant may be utilized for performing a D-UL transmission. If no UL data are available for transmission, the D-UL transmission may include a BSR, but no UL data. For the next time interval, the method may then return to step 530.

If at step 540 no D-UL grant was received by the communication device, the method may proceed with step 550, as indicated by branch "N".

At step 550, the communication device may check if UL data need to be transmitted by the communication device. If this is the case, the method may proceed with step 555, as indicated by branch "Y".

At step 555, the communication device selects the active mode and performs an IUA-UL transmission on the UL radio resources indicated in the IUA-UL grant. This IUA-UL transmission includes at least a part of the UL data and may further include a BSR. For the next time interval, the method may then return to step 530.

If at step 550 there is no need for transmission of UL data, the method may proceed with step 560, as indicated by branch "N".

At step 560, the communication device may check whether a trigger condition for sending a BSR is fulfilled. If this is the case, the method may proceed with step 565, as indicated by branch "Y".

At step 565, the communication device selects the active mode and performs an IUA-UL transmission on the UL radio resources indicated in the IUA-UL grant. This IUA-UL transmission includes a BSR, but no UL data. For the next time interval, the method may then return to step 530.

If at step 560 no trigger condition for sending a BSR is fulfilled, the method may proceed with step 570, as indicated by branch "N".

At step 570, the communication device selects the inactive mode and performs no IUA-UL transmission on the UL radio resources indicated in the IUA-UL grant. For the next time interval, the method may then return to step 530.

Figure 6:
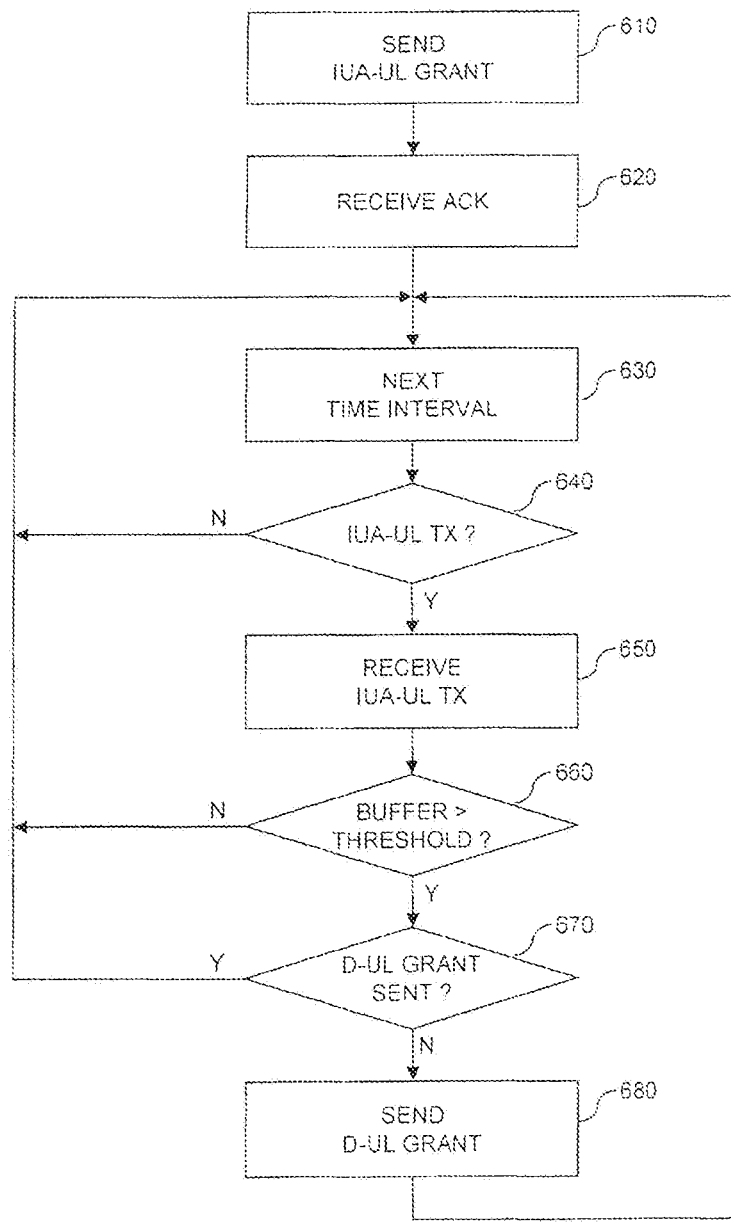
FIG. 6 shows a flowchart for illustrating a method according to an embodiment of the invention, which may be implemented by a network node.

FIG. 6 shows a flowchart for illustrating a method which may be implemented by a node of the cellular network, e.g., the eNB 100, to control a communication device in accordance with the above-mentioned concepts. If a processor based implementation of the node is used, the steps of the method may be performed by one or more processors of the node device. For this purpose, the processor(s) may execute correspondingly configured program code. Further, at least some of the corresponding functionalities may be hardwired in the processor(s).

At step 610, the node sends the IUA-UL grant to the communication device. The node may send the IUA-UL grant on a DL control channel, e.g., on the PDCCH of the LTE radio access technology. The IUA-grant indicates radio resources allocated to the communication device in reoccurring time intervals, e.g., corresponding to a periodic pattern of subframes.

As indicated by step 620, the node may then receive an acknowledgement of receipt of the IUA-UL grant by the communication device. For example, the acknowledgement may be indicated by a padded UL transmission on the allocated UL radio resources indicated in the IUA-UL grant.

The node may then enter the IUA operation and perform the following actions when reaching a next time interval with allocated UL radio resources indicated in the IUA-UL grant, as indicated by step 630.

At step 640, the node may check if the communication device performed an IUA-UL transmission on the UL radio resources indicated in the IUA-UL grant. For this purpose, the node may for example detect a signal level on the UL radio resources. If the signal level is above a threshold, the node may determine that the communication device performed an IUA-UL transmission on the UL radio resources indicated in the IUA-UL grant.

If at step 640 no IUA-UL transmission on the UL radio resources indicated in the IUA-UL grant is detected, the method may return to step 630 for the next time interval, as indicated by branch "N".

If at step 640 an IUA-UL transmission on the UL radio resources indicated in the IUA-UL grant is detected, the method may continue with step 650, as indicated by branch "Y".

At step 650, the node may receive the IUA-UL transmission. As mentioned above the IUA-UL transmission may also include a BSR. Further, the IUA-UL transmission may include UL data.

At step 660, the node may check if the BSR indicates that an amount of UL data to be transmitted by the communication device is above threshold. The threshold may be preconfigured or may be calculated in a dynamic manner, e.g., on the basis of a HARQ roundtrip time $T_{HRTT}$, in units of the time periods with allocated UL resources indicated by the IUA-UL grant (i.e., in units of the IUA period), and a size $S_{IUAG}$ of the IUA-UL grant, i.e., the data capacity of the allocated UL radio resources indicated by the IUA-UL grant. For example, the threshold may be calculated according to:

$$\text{Threshold} = T_{HRTT} * S_{IUAG} + A, \quad (1)$$

where A may be a constant or function that may be used to ensure that sending a D-UL grant is only triggered if the amount of UL data still to be sent after the HARQ roundtrip time $T_{HRTT}$ is not too small.

If at step 660 the amount of UL data to be transmitted is not above the threshold, the method may return to step 630 for the next time interval, as indicated by branch "N".

If at step 660 the amount of UL data to be transmitted is above the threshold, the method may continue with step 670, as indicated by branch "Y".

At step 670, the node may check if a D-UL grant was already sent to the communication device, but not yet utilized. If this is the case, the method may return to step 630 for the next time interval, as indicated by branch "Y".

If at step 670 it is found that there is no D-UL grant which was sent to the communication device, but not yet utilized, the method may continue with step 680 as indicated by branch "N".

At step 680, the node may send a new D-UL grant to the communication device. The size $S_{DG}$ of this new D-UL grant may be determined on the basis of amount of data $V_B$ indicated in the BSR and the size $S_{IUAG}$ of the IUA-UL grant, e.g., according to:

$$S_{DG} = V_B - T_{HRTT} * S_{IUAG}. \quad (2)$$

After sending the D-UL grant at step 680, the method may return to step 630 for the next time interval.

By the checks in steps 660 and 670 of FIG. 6, it can be avoided that a D-UL grant is sent to the communication device which is actually not required. Specifically, the check of step 660 may ensure that the D-UL grant is sent if transmission of the UL data is on the UL radio resources indicated in the IUA-UL grant is not possible before the D-UL grant is received by the communication device.

Figure 7:
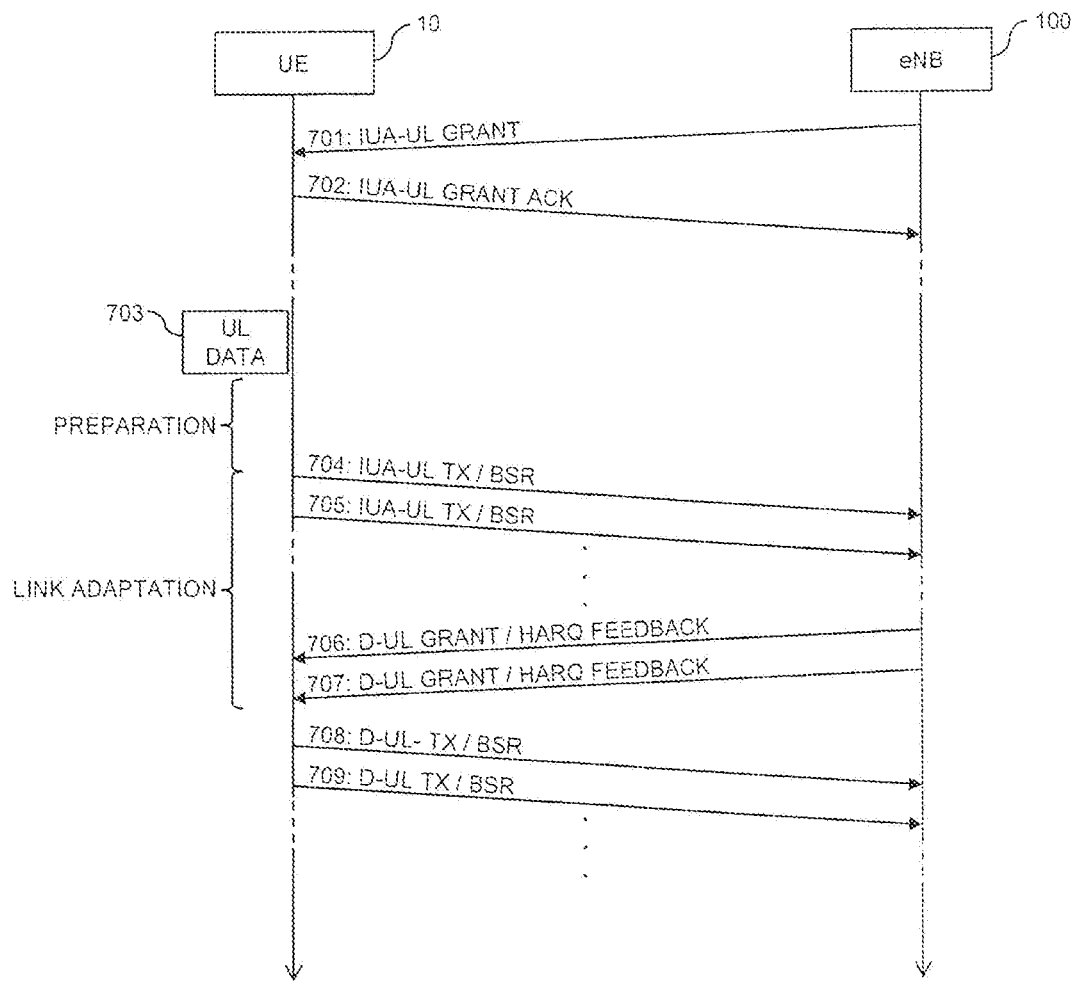
FIG. 7 schematically illustrates an exemplary sequence of processes when for performing UL radio transmissions according to an embodiment of the invention.

FIG. 7 shows further a typical sequence of processes for performing UL transmissions on the basis of the IUA-UL grant. Also the processes of FIG. 7 involve the UE 10 and the eNB 100.

In the processes of FIG. 7, initially the eNB 100 sends a IUA-UL grant 701 to the UE 10. The IUA-UL grant 701 indicates UL radio resources allocated to the UE 10 in reoccurring time intervals. In the example of FIG. 7, it is assumed that these IUA UL radio resources are allocated in each subframe. The IUA-UL grant 701 may be sent on the PDCCH.

The UE 10 then performs an initial IUA-UL transmission with an IUA-UL grant acknowledgement 702. If the UE 10 has no UL data to transmit, the IUA-UL grant acknowledgement 702 may be a IUA-UL transmission with padding. The IUA-UL grant acknowledgement 702 confirm receipt of the IUA-UL grant 701 to the eNB 100. If the IUA-UL grant acknowledgement 702 is not received by the eNB 100, the eNB 100 may resend the IUA-UL grant 701. The usage of the IUA-UL grant acknowledgement 702 is optional and may for example be configured during connection configuration, e.g., by the control information 201 of FIG. 2. The IUA-UL grant 701 may be valid for an open time period, e.g., until de-configured by the eNB 100. Alternatively, also a validity period could be indicated together with the IUA-UL grant 701 or in separate control information, such as the control information 201 of FIG. 2.

When UL data for transmission becomes available at the UE 10, the UE 10, as indicated by 703, the UE 10 may prepare one or more IUA-UL transmissions on the allocated UL radio resources of the IUA-UL grant. FIG. 7 also illustrates a corresponding processing time, e.g., associated with layer 2 and layer 1 processing. If a BSR is triggered, the UE 10 may also add the BSR to the IUA-UL transmissions.

The UE 10 then sends the IUA-UL transmission(s) 704, 705 at the next time intervals with UL radio resources indicated by the IUA-UL grant.

When the eNB 100 receives the IUA-UL transmissions 704, 705 it may evaluate the included BSR to decide whether sending of one or more D-UL grants to the UE 10 is appropriate, e.g., using processes as explained in connection with FIG. 6.

In the illustrated example, the eNB 100 sends D-UL grants 706 and 707 to the UE 10. As further illustrated, these D-UL grants 706, 707 may be accompanied by HARQ feedback with respect to the IUA-UL transmissions 704, 705.

While performing the IUA-UL transmissions 704, 705 and transmitting the D-UL grants 706, 707, the UE 10 and the eNB 100 may accomplish link adaptation of the radio link between the UE 10 and the eNB 100, e.g., by selecting a suitable modulation and coding scheme (MCS) and/or transmission power. This link adaptation phase may last for about one HARQ roundtrip time, e.g., eight subframes. After that, a higher performance may be achieved due to optimized link adaptation.

The UE 10 may then continue performing UL transmissions on the further allocated radio resources indicated by the D-UL grants 706, 707, as illustrated by D-UL transmissions 708 and 709. As illustrated, the D-UL transmissions 708, 709 may each include a BSR, so that further D-UL grants may be issued to the UE 10 as long as it has UL data for transmission.

As mentioned above, the IUA-UL grant and D-UL grants may be utilized in parallel. In particular, the IUA-UL grant may be utilized to provide a basic allocation of UL radio resources which allows for fast initial access without a preceding scheduling request. The D-UL grants may in turn be utilized provide further allocated UL radio resources if there is a higher traffic demand by the UE 10.

For achieving a more efficient utilization of the allocated UL radio resources, utilization of the D-UL grants may be prioritized over the utilization of the IUA-UL grant in time intervals where both types of grants indicate allocated UL radio resources. This prioritization may for example be achieved by performing the check of step 540 in FIG. 5.

When utilizing a long lasting grant, such as the IUA-UL grant, there may be a risk of a collision of UL transmissions by different communication devices. For example, the eNB 100 may first provide a D-UL grant to the UE 10', and the UE 10' may perform a D-UL transmission in the UL radio resources allocated by the D-UL grant. A delay between providing the D-UL grant to the UE 10' and the D-UL transmission by the UE 10' may be four TTIs. In this time interval, the eNB 100 may provide a IUA-UL grant to the UE 10. Because the UL radio resources allocated by the D-UL grant are available again (since the D-UL grant covers only one TTI), the eNB 100 allocates at least a part or all these UL radio resources by the IUA-UL grant to the UE 10. Now assuming that the UL transmission of the UE 10' on the UL radio resources allocated by the D-UL grant fails, a retransmission by the UE 10' on the same UL radio resources by the UE 10' will be triggered. Due to the HARQ processing, e.g., involving detection of the failure of the initial UL transmission by the UE 10', sending a HARQ NACK from the eNB 100 to the UE 10', and preparing the retransmission by the UE 10', the retransmission by the UE 10' is performed eight TTIs from the initial UL transmission, i.e., at a time when at least a part of the UL radio resources previously allocated by the D-UL grant to the UE 10' is now allocated by the IUA-UL grant to the UE 10. Accordingly, the retransmission by the UE 10' may collide with a IUA-UL transmission by the UE 10. While such collision may be avoided by simply not including the UL radio resources allocated by the D-UL grant to the UE 10' in the later IUA-UL grant to the UE 10, such selection of UL radio resources to be allocated by the IUA-UL grant may be too restrictive and excessively limit the availability of UL resources to be allocated by the IUA-UL grant. Specifically, such selection would also exclude UL radio resources in which a retransmission does actually not occur because the initial D-UL transmission is successful.

In the following concepts will be described which allow for efficiently avoiding such collisions without unduly limiting the selection of UL radio resources to be allocated by a IUA-UL grant. According to these concepts, the eNB 100 detects the need of a retransmission on the UL radio resources allocated by the IUA-UL grant and then controls the communication device, to which the UL radio resources are allocated by the IUA-UL grant, to disable utilization of at least a part of the UL radio resources allocated by the IUA-UL grant, at least in the time interval when the retransmission is going to happen. This temporary disabling of the utilization may be achieved by sending corresponding control information to the communication device. In view of the time scale on which the retransmissions are triggered, the control information may be sent on a DL control channel, e.g., a PDCCH of the LTE radio access technology, utilizing a similar mechanism or format as for sending the D-UL grants or the IUA-UL grant. In this way, fast reaction in the case of detecting a need for a retransmission can be ensured. However, a part of the control information could also be provided by other control signaling, e.g., by an RRC message. For example, a duration of time period for which the utilization of the UL radio resources allocated by the IUA-UL grant is to be disabled and/or an offset between transmission of the control information and the disabling of the utilization could be indicated beforehand by such other control signaling to the communication device, e.g., in the configuration information 201 of FIG. 2, and then be applied when the disabling is triggered by a message on the DL control channel. In examples as further described in the following, it will be assumed that the disabling is triggered by a DCI (DL control information) message on the PDCCH which utilizes the same or a similar format as applied for sending the D-UL grants or IUA-UL grants, and such control message is referred to as a "hold grant".

Similar to a D-UL grant, the hold grant may be valid for a specific TTI, e.g., defined by a number of TTIs from receipt of the hold grant. For example, the hold grant could trigger the disabling of the utilization of the allocated UL radio resources in the fourth TTI from reception of the hold grant. In some scenarios, the hold grant could also include further information specifying a number of TTIs for which the utilization of the allocated UL radio resources is to be disabled. Further, the hold grant could be valid until further control information is received to re-enable the utilization of the allocated UL radio resources, e.g., in the form of a further hold grant or other DCI message. If merely the disabling is to be triggered, the hold grant can be indicated by a single bit in the DCI.

In some scenarios, the hold grant may apply to all UL radio resources allocated by the IUA-UL grant. In such cases, when the communication device receives a hold grant with respect to a certain time interval, it will not perform a IUA-UL transmission. In other scenarios, the hold grant may specify the UL radio resources of which utilization is to be disabled. If these include only a part of the UL radio resources allocated by the IUA-grant, the communication device may continue utilization on the other part of the UL radio resources allocated by the IUA-UL grant, i.e., may send a IUA-UL transmission on the other part of the UL radio resources.

In some scenarios, also one or more other communication devices may have received a IUA-UL grant allocating UL radio resources on which the retransmission is going to happen. In such scenarios the hold grant could be addressed as a broadcast message to these multiple communication devices. This addressing could be achieved by utilizing a specific C-RNTI assigned to the multiple communication devices. Such C-RNTI could be preconfigured in the communication device or could be indicated to the communication device in configuration information, e.g., in the configuration information 201 of FIG. 2.

By the temporary disabling of the IUA operation when detecting the need for a retransmission on the UL radio resources allocated by the IUA-UL grant, a reasonable latency can be provided to each involved communication device. Specifically, by prioritizing the retransmission over a potential new IUA-UL transmission, it can be avoided that a still further retransmission is required, which would typically increase the latency for the communication device performing the retransmission by further eight TTIs. At the same time, there is only a small potential increase of the latency experienced by the communication device for which the IUA operation is temporarily disabled, corresponding to the duration of the temporary disabling of the IUA operation, which may be as low as one TTI.

Figure 8:
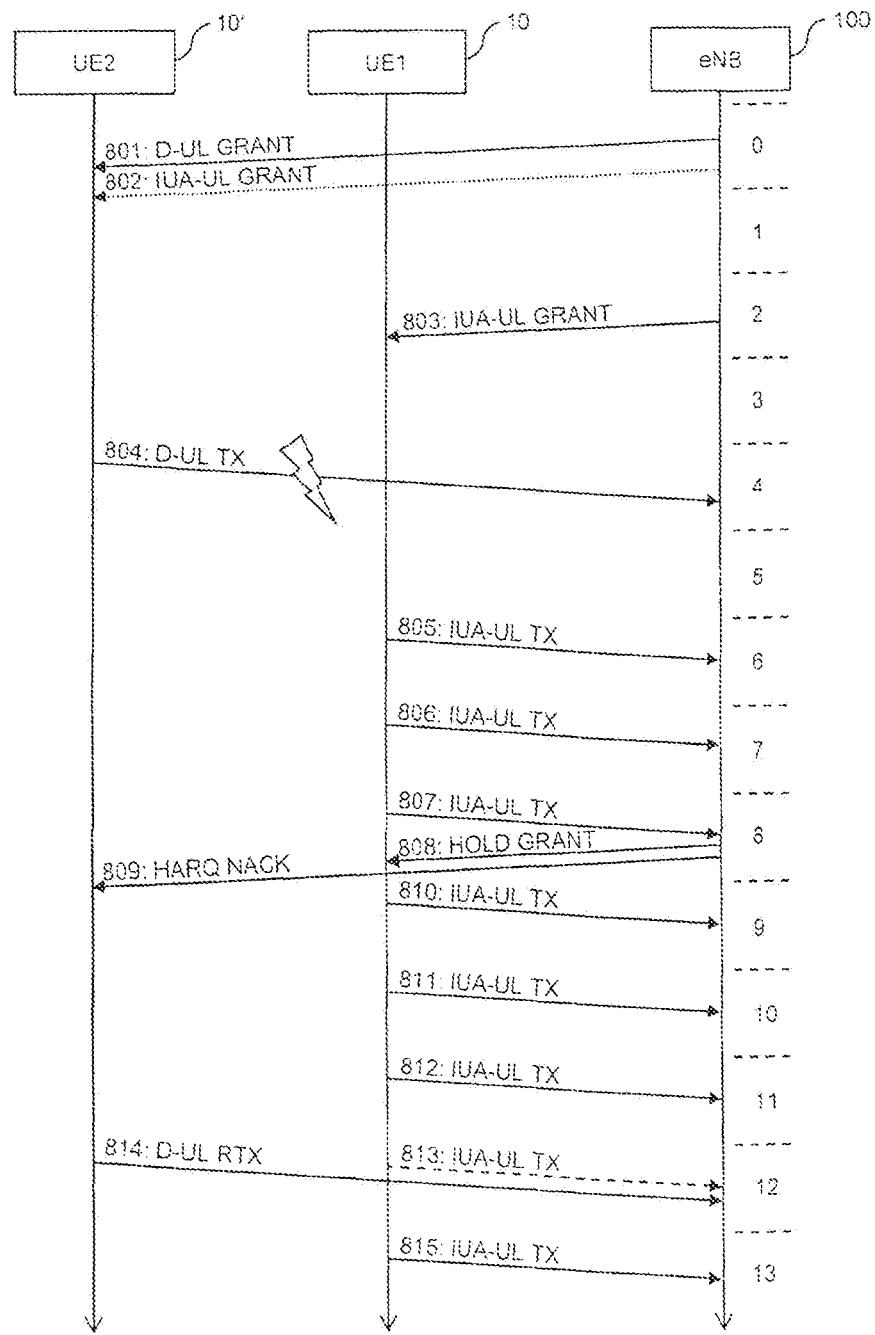
FIG. 8 illustrates exemplary processes in which a collision of UL transmissions is avoided according to an embodiment of the invention.

FIG. 8 illustrates exemplary processes in which a collision on resources allocated by a IUA-UL grant is avoided in accordance with the above concepts. The processes involve the UE 10 (UE 1), the further UE 10' (UE 2), and the eNB 100. To better illustrate the timing of the processes, a sequence of TTIs (0 to 13) is indicated on the right hand side of FIG. 9. Each TTI may have a duration of 1 ms, corresponding to the duration of one subframe in the LTE radio access technology.

In the processes of FIG. 8, the eNB 100 sends a D-UL grant 801 to the UE 10'. This may be accomplished on the PDCCH and in response to a scheduling request by the UE 10' or in response to a BSR from the UE 10'. The D-UL grant is sent in TTI 0. The D-UL grant 801 allocates UL radio resources in a single TTI to the UE 10'. This TTI is four TTIs after sending the D-UL grant, i.e., in TTI 4.

As further illustrated, the eNB 100 may also send a IUA-UL grant 802 to the UE 10' (in TTI 0 or some other TTI), e.g., on the PDCCH. As explained above, the IUA-UL grant 802 may allocate UL radio resources in reoccurring time intervals to the UE 10', e.g., in each TTI. However, for the sake of a better overview, potential actions concerning the IUA-UL grant 802 are not illustrated in FIG. 8.

In the processes of FIG. 8 it is assumed that after sending the D-UL grant 801 to the UE 10', the eNB 100 sends a IUA-UL grant 803 to the UE 10, e.g., on the PDCCH. The IUA-UL grant 803 allocates UL radio resources in reoccurring time intervals the UE 10. In the example of FIG. 8, it is assumed that the IUA-UL 803 grant allocates the UL radio resources in each TTI (starting from TTI 6). However, other periodicities could be utilized as well, e.g., every second or third TTI.

The IUA-UL 803 grant is sent in TTI 2, when the eNB 100 may regard the UL radio resources allocated by the D-UL grant 801 to the UE 10' as being available for allocation by the IUA-UL grant 802, because the earliest possible TTI when the UE 10 may utilize the UL radio resources allocated by the IUA-UL grant 803 (TTI 6) is after the TTI with the UL radio resources allocated by the D-UL grant 801 (TTI 4). Accordingly, the eNB 100 allocates at least a part of the UL radio resources, which were previously allocated by the D-UL grant 801 to the UE 10', by the IUA-UL 803 grant to the UE 10, thereby enabling efficient reuse of the UL radio resources. Because the D-UL grant 801 pertains to a TTI in which the UL radio resources allocated by the IUA-UL grant 803 are not yet utilized, there is no actual overlap of the UL radio resources allocated by the D-UL grant 801 and the IUA-UL grant 803, even though the D-UL grant 801 and the IUA-UL grant 803 may indicate the same or overlapping RBs.

The UE 10' then performs a D-UL transmission 804 in the UL radio resources allocated by the D-UL grant 801. The D-UL transmission 804 is sent in TTI 4. The D-UL transmission 804 may include UL data and/or a BSR. In the example of FIG. 8, it is assumed that the D-UL transmission 804 fails, i.e., is not successfully received by the eNB 100. This failure may for example be due to interference or some other disturbance. The failure is detected by the eNB 100 as part of the HARQ processing at the eNB 100.

As further illustrated, occasions for IUA-UL transmissions by the UE 10 in the UL radio resources allocated by the IUA-UL grant 803 start in TTI 6 and reoccur in TTIs 7, 8, 9, . . . . Accordingly, on the UL radio resources allocated by the IUA-UL grant 803, the UE 10 may perform an IUA-UL transmission 805 in TTI 6, an IUA-UL transmission 806 in TTI 7, and/or an IUA-UL transmission 807 in TTI 8. Further, in each of these TTIs the UE 10 may also select the inactive mode and perform no IUA-UL transmission.

As further illustrated in FIG. 8, in TTI 8 the eNB 100 sends a hold grant 808 to the UE 10 and a HARQ NACK the UE 10'. The hold grant 808 and the HARQ NACK 809 are sent in response to detecting the failure of the D-UL transmission 804. The HARQ NACK 809 has the purpose of triggering a retransmission of the D-UL transmission 804 by the UE 10'. The hold grant 808 has the purpose of avoiding a collision of this retransmission with a IUA-UL transmission by the UE 10. The retransmission is performed on the same UL radio resources as used for the D-UL transmission 804, i.e., the UL radio resources allocated by the D-UL grant 801. The hold grant 808 disables utilization of these UL radio resources on the basis of the IUA-UL grant 803 by the UE 10 in the TTI of the retransmission, which in the illustrated example is TTI 12.

In view of the hold grant 808, the UE 10 may perform an IUA-UL transmission 810 in TTI 9, an IUA-UL transmission 811 in TTI 10, and/or an IUA-UL transmission 812 in TTI 11. Further, in each of these TTIs the UE 10 may also select the inactive mode and perform no IUA-UL transmission. However, in TTI 12 a potential IUA-UL transmission 813 by the UE 10 is prevented by the hold grant. The UE 10 may thus perform the retransmission of the D-UL transmission 804 (denoted by D-UL RTX 814), without a risk of a collision with the potential IUA-UL transmission 813. The chances of the retransmission 814 being successful are thus improved and worsening the latency experienced by the UE 10' by a further time period of eight TTIs (until the next possible retransmission) can be avoided. In TTI 13 the UE 10 may again perform an IUA-UL transmission 815. Therefore there is only a small potential worsening of the latency experienced by the UE 10, corresponding to one TTI when assuming a need for a IUA-UL transmission in TTI 12. In the case that the UE 10 has no need to perform a IUA-UL transmission in TTI 12 (e.g., because no UL data is available for transmission or no BSR is triggered), the hold grant 808 has no impact on the latency experienced by the UE 10.

FIG. 9 schematically illustrates an exemplary allocation of UL radio resources underlying the processes of FIG. 8. Specifically, FIG. 9 shows a possible allocation of UL radio resources in TTIs 4 to 13. In FIG. 9, the UL radio resources allocated by the D-UL grant 801 to the UE 10' are referred to as "D-RB UE2". The UL radio resources allocated by IUA-UL grant 802 to the UE 10' are referred to as "IUA-RB UE2". The UL radio resources allocated by IUA-UL grant 803 to the UE 10 are referred to as "IUA-RB UE1". The UL radio resources of the initial UL transmission in TTI 4 and the associated retransmission in TTI 12 are further marked with "(RX)" and "(RTX)", respectively.

As can be seen in FIG. 9, in TTIs 4 and 6, UL radio resources are allocated to the UE 10' only. In TTIs 4 to 11 and 13, UL radio resources are allocated to both the UE 10' and the UE 10. In TTI 12, the allocation of the UL radio resources to the UE 10 by the IUA-UL grant is disabled, so that these UL radio resources can be utilized by the UE 10' for performing the retransmission.

It should be noted that the detailed timing as illustrated in FIGS. 8 and 9 is merely exemplary. For example, in the example of FIGS. 8 and 9 a HARQ roundtrip time of eight TTIs from performing the initial UL transmission to performing the retransmission is assumed. However, similar processes could also be based on a shorter or longer HARQ roundtrip time. Further, other delays between receiving the D-UL grant and the D-UL transmission on the UL radio resources allocated by D-UL grant and/or other delays between receiving the IUA-UL grant and the first occasion for a IUA-UL transmission on the UL radio resources allocated by IUA-UL grant could be utilized.

Moreover, the utilization of the hold grant is not limited to avoiding collisions for a retransmission of a D-UL transmission on UL radio resources allocated by a D-UL grant. In some scenarios, the hold grant could also be utilized for avoiding a collision between a retransmission of a IUA-UL transmission, e.g., when IUA-UL grants are utilized for allocating the same or overlapping UL radio resources to different communication devices. For example, in a modification of the processes of FIG. 8, the D-UL grant 801 could be omitted and the initial UL transmission 804 in TTI 4 could be a IUA-UL transmission on UL radio resources allocated by the IUA-UL grant 802. When further assuming that the UL radio resources allocated by the IUA-UL grant 802 and by the IUA-UL grant 803 are the same or overlapping, the hold grant 808 may be utilized to avoid a collision between the retransmission of the IUA-UL transmission in TTI 12 and the potential IUA-UL transmission 813 in TTI 12. FIG. 10 schematically illustrates an exemplary allocation of UL radio resources when assuming such overlapping allocation of UL radio resources to the UE 10 and the UE 10'.

Specifically, FIG. 10 shows a possible allocation of UL radio resources in TTIs 4 to 13. In FIG. 10, the UL radio resources allocated by the IUA-UL grant 802 to the UE 10' are referred to as "IUA-RB UE2". The UL radio resources allocated by IUA-UL grant 803 to the UE 10 are referred to as "IUA-RB UE1". The UL radio resources of the initial UL transmission in TTI 4 and the associated retransmission in TTI 12 are further marked with "(RX)" and "(RTX)", respectively.

As can be seen in FIG. 10, in TTIs 4 and 6, UL radio resources are allocated to the UE 10' only. In TTIs 4 to 11 and 13, overlapping UL radio resources are allocated to both the UE 10' and the UE 10. In TTI 12, the allocation of the UL radio resources to the UE 10 by the IUA-UL grant 803 is disabled, so that these UL radio resources can be utilized by the UE 10' for performing the retransmission. By the hold grant 808, the retransmission 814 may be prioritized over the potential new IUA-UL transmission 813 in TTI 12, so that undue worsening of the latency experienced by the UE 10' can be avoided.

An overlapping allocation of UL radio resources as assumed in the example of FIG. 10 may be efficient if the UL radio resources allocated by the IUA-UL grant being utilized in a conditional manner, e.g., as explained above by selecting between the active mode and the inactive mode. Due to the conditional utilization a IUA-UL transmission is not performed on every possible occasion, which means that there is only a certain probability of a conflict of IUA-UL transmissions by the UE 10 and the UE 10', which may be tolerable.

Figure 11:
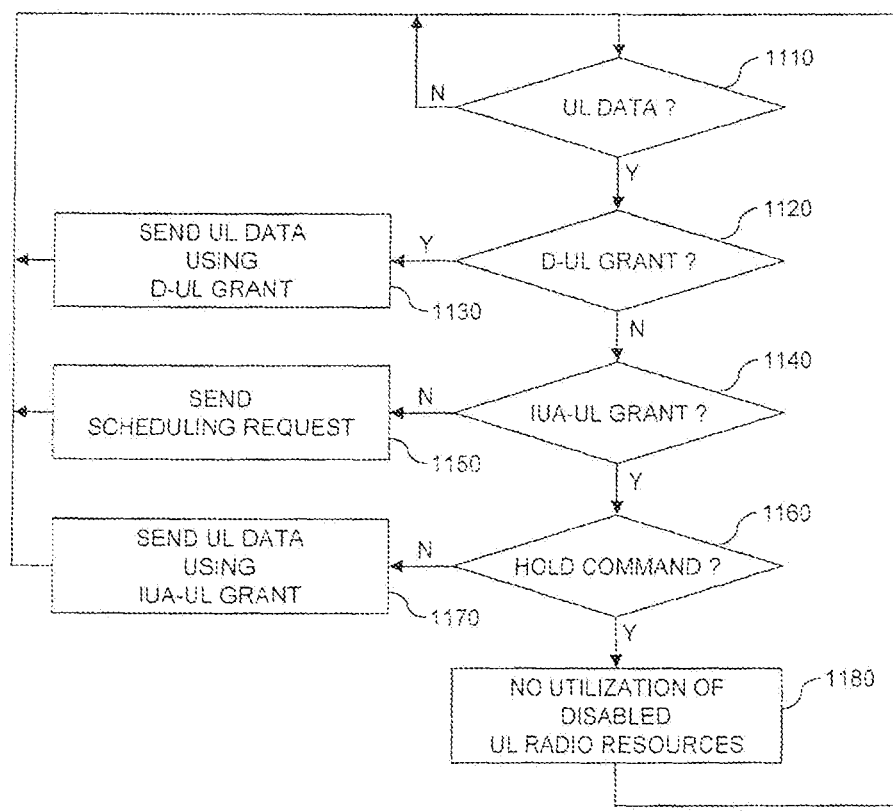
FIG. 11 shows a flowchart for illustrating a method according to an embodiment of the invention, which may be used for implementing functionalities for avoiding collisions of UL transmissions in a communication device.

FIG. 11 shows a flowchart for illustrating method which may be used to consider the hold grant in the operation of a communication device, such as the UE 10. If a processor based implementation of the communication device is used, the steps of the method may be performed by one or more processors of the communication device. For this purpose, the processor(s) may execute correspondingly configured program code. Further, at least some of the corresponding functionalities may be hardwired in the processor(s).

At step 1110, the communication device may check if UL data are available for transmission. If this is not the case, the method may return to step 1110 for the next TTI, as indicated by branch "N". If UL data are found to be available for transmission, the method may continue with step 1120, as indicated by branch "Y".

At step 1120, the communication device may check if a D-UL grant for the present TTI was received by the communication device. If this is the case, the method may proceed with step 1130, as indicated by branch "Y".

At step 1130, the UL radio resources allocated by the D-UL grant may be utilized for performing a D-UL transmission with at least a part of the UL data. This D-UL transmission may also include a BSR. The method may then return to step 1110 for the next TTI.

If at step 1120 it is found that no D-UL grant for the present TTI was received by the communication device, the method may proceed with step 1140, as indicated by branch "N".

At step 1140, the communication device may check if a IUA-UL grant valid for the present TTI was received by the communication device. If this is not case, the method may proceed with step 1150, as indicated by branch "N".

At step 1150, the communication device may send a scheduling request to obtain an allocation of UL radio resources for sending the available UL data. The method may then return to step 1110 for the next TTI.

If at step 1140 it is found that a IUA-UL grant valid for the present TTI was received by the communication device, the method may proceed with step 1160, as indicated by branch "Y".

At step 1160, the communication device may check if a hold grant for the present TTI was received by the communication device. If this is not case, the method may proceed with step 1170, as indicated by branch "N".

At step 1170, the UL radio resources allocated by the IUA-UL grant may be utilized for performing a IUA-UL transmission with at least a part of the UL data. This IUA-UL transmission may also include a BSR. The method may then return to step 1110 for the next TTI.

If at step 1160 it is found that a hold grant for the present TTI was received by the communication device, the method may proceed with step 1180, as indicated by branch "Y".

At step 1180 the communication device does not utilize the UL radio resources to which the hold grant pertains. This may involve entirely refraining from performing an IUA-UL transmission in the UL radio resources indicated in the IUA-UL grant. In some cases, e.g., if the hold grant disables only a part of the UL radio resources indicated in the IUA-UL grant, the communication device may also perform a IUA-UL transmission on the other part of the UL radio resources, which was not disabled by the hold grant.

After step 1180, the method may return to step 1130 for the next TTI.

Figure 12:
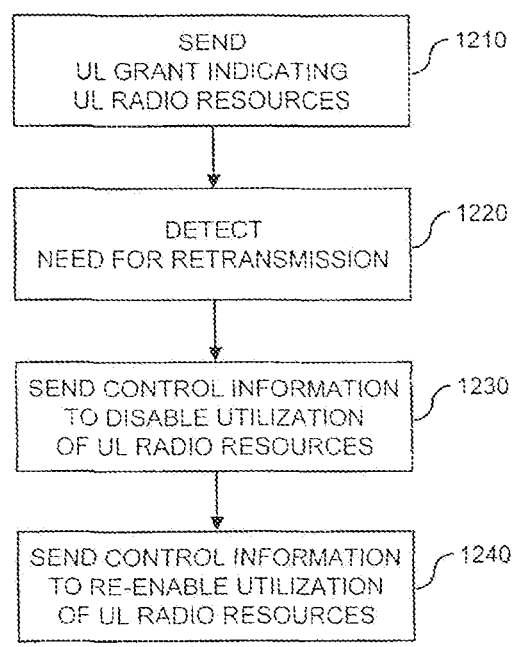
FIG. 12 shows a flowchart for illustrating a method according to an embodiment of the invention, which may be implemented by a network node.

FIG. 12 shows a flowchart for illustrating a method of controlling radio transmission in a cellular network. The method may be used for implementing the above-described concepts in a node of the cellular network, e.g., in a node which is responsible for scheduling transmissions, such as the eNB 100 or an RNC when using the UMTS radio access technology. If a processor based implementation of the node is used, the steps of the method may be performed by one or more processors of the node. For this purpose, the processor(s) may execute correspondingly configured program code. Further, at least some of the corresponding functionalities may be hardwired in the processor(s).

At step 1210, the node sends a UL grant to a communication device, e.g., to the UE 10. The node may send the UL grant on a DL control channel, e.g., a PDCCH of the LTE radio access technology. The UL grant indicates UL radio resources allocated to the communication device in reoccurring time intervals. Examples of such UL grant are the IUA-UL grants 203, 701, 802, and 803. Further, the UL grant could also correspond to another type of long lasting grant, e.g., an SPS grant. The time intervals may reoccur periodically. However, other patterns of reoccurrence could be utilized as well. A periodicity in which the time intervals reoccur may be indicated in the UL grant or in separate control information transmitted to the communication device, such as in the configuration information 201 of FIG. 2. The time intervals may correspond to TTIs in which radio transmission in the cellular network is organized. For example, in the LTE radio technology the radio transmission may be organized in radio frames each subdivided into subframes, and the time intervals may correspond to subframes. The allocated UL radio resources may be radio resources of a UL data channel, such as a PUSCH of the LTE radio access technology.

The node may send the UL grant in response to detecting a change of a connection status of the communication device, e.g., when the communication device enters the cellular network and connects thereto, when the communication device enters a different cell or area of the cellular network, or the like. Further, the node may send the UL grant according to a periodic schedule, e.g., every minute or hour. In each case, no request for the UL grant by the communication device is required.

For each of the time intervals indicated at step 1210, the node may select between an active mode and an inactive mode. In the active mode the communication device performed a UL transmission in the allocated UL radio resources. In the inactive mode the communication device performed no UL transmission in the allocated UL radio resources. Accordingly, the node decides for each of the time intervals whether the communication device performed a transmission on the allocated UL radio resources. This may for example be accomplished by detecting signals from the communication device in the allocated UL radio resources. In response to detecting no signals from the communication device in the allocated UL radio resources, the node may select the inactive mode. In response to detecting signals from the communication device in the allocated UL radio resources, the node may select the active mode.

At step 1220, the node detects a need for a UL retransmission by a further communication device, such as the UE 10, in one of the time intervals and in at least a part of the UL radio resources allocated by the UL grant of step 1210. The node may detect the need for a UL retransmission by first detecting a failed transmission by the further communication device in this part of the UL radio resources allocated by the UL grant of step 1210. In response to detecting the failed transmission, the node may also conclude that there is a need for a UL retransmission. Detecting the need for a retransmission may be part of requesting the retransmission in a HARQ process. That is to say, when sending a HARQ NACK, such as the HARQ NACK 809 of FIG. 8, the node may also assume that there will be a retransmission.

In some scenarios, the UL radio resources allocated by the UL grant of step 1210 may be overlapping with UL radio resources which are allocated by a further UL grant to the further communication device, e.g., as explained in connection with the scenario of FIG. 10.

At step 1230, the node may send control information to the communication device. The control information temporarily disables utilization, by the communication device, of at least that part of the allocated UL radio resources in which the retransmission is expected. The utilization is disabled in at least that time interval in which the retransmission is expected. The control information may disable the utilization for a configured time period, e.g., for a subframe or TTI, or for a configured number of subframes or TTIs. Such time period may also be indicated by the control information. In some scenarios, the control information may also indicate the UL radio resources of which the utilization by the communication device is disabled, e.g., in terms of RBs. The node may send the control information on a DL control channel between the node and the communication device, e.g., on a PDCCH of the LTE radio access technology. In some scenarios, the node may send the control information in a broadcast message addressed to a plurality of communication devices, e.g., by utilizing a group C-RNTI to address the communication device and other communication devices. An example of such control information is the above-mentioned hold grant.

In some scenarios, after sending the control information of step 1230, the node may send further control information to the communication device. The further control information may re-enable the utilization of the allocated UL radio resources by the communication device. Similar to the control information of step 1230, the further control information may indicate the UL radio resources of which the utilization by the communication device is re-enabled, e.g., in terms of RBs, and/or the node may send the further control information on the DL control channel between the node and the communication device, e.g., the PDCCH of the LTE radio access technology. In some scenarios, the node may send the further control information in a broadcast message addressed to a plurality of communication devices, e.g., by utilizing a group C-RNTI to address the communication device and other communication devices.

Figure 13:
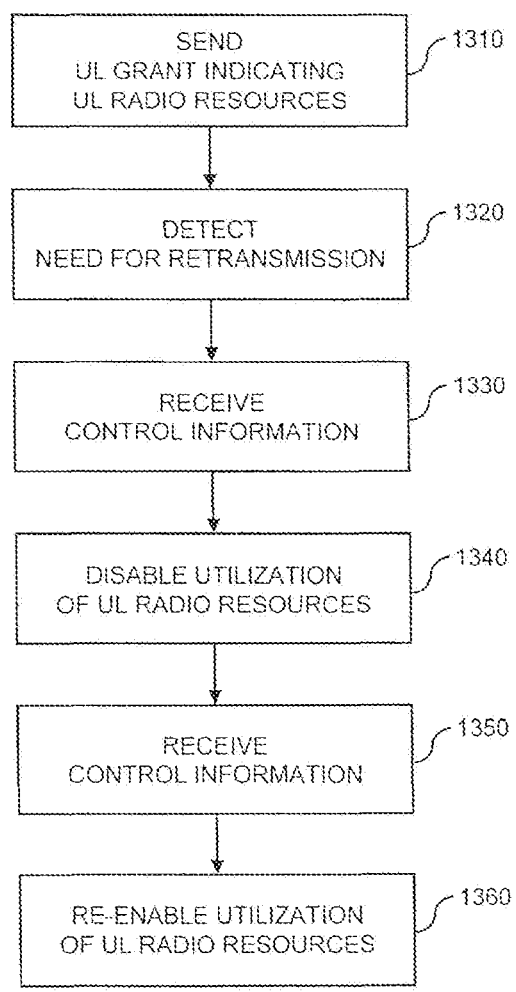
FIG. 13 shows a flowchart for illustrating a further method according to an embodiment of the invention, which may be implemented by a communication device.

FIG. 13 shows a flowchart for illustrating a method of controlling radio transmission in a cellular network. The method may be used for implementing the above-described concepts in a communication device with connectivity to the cellular network, e.g., the UE 10. If a processor based implementation of the communication device is used, the steps of the method may be performed by one or more processors of the communication device. For this purpose, the processor(s) may execute correspondingly configured program code. Further, at least some of the corresponding functionalities may be hardwired in the processor(s).

At step 1310, the communication device receives a UL grant from the cellular network, e.g., from the eNB 100. The communication device may receive the UL grant on a DL control channel, e.g., a PDCCH of the LTE radio access technology. The UL grant indicates UL radio resources allocated to the communication device in reoccurring time intervals. Examples of such UL grant are the IUA-UL grants 203, 701, 802, and 803. Further, the UL grant could also correspond to another type of long lasting grant, e.g., an SPS grant. The time intervals may reoccur periodically. However, other patterns of reoccurrence could be utilized as well. A periodicity in which the time intervals reoccur may be indicated in the UL grant or in separate control information transmitted to the communication device, such as in the configuration information 201 of FIG. 2. The time intervals may correspond to TTIs in which radio transmission in the cellular network is organized. For example, in the LTE radio technology the radio transmission may be organized in radio frames each subdivided into subframes, and the time intervals may correspond to subframes. The allocated UL radio resources may be radio resources of a UL data channel, such as a PUSCH of the LTE radio access technology.

In some scenarios, the UL radio resources allocated by the UL grant of step 1310 may be overlapping with UL radio resources which are allocated by a further UL grant to a further communication device, e.g., the UE 10'. A corresponding exemplary scenario is explained in connection with FIG. 10.

For each of the time intervals indicated at step 1310, the communication device may select between an active mode and an inactive mode. In the active mode the communication device performs a UL transmission in the allocated UL radio resources. In the inactive mode the communication device performs no UL transmission in the allocated UL radio resources. Accordingly, the utilization of the UL radio resources allocated by the UL grant of step 1610 is conditional.

The selection may involve that the communication device checks whether UL data is available for transmission by the communication device. In response to UL data being available for transmission, the communication device may select the active mode to perform a UL transmission which includes at least a part of the UL data.

In response to UL data being available for transmission, the communication device may also send a scheduling request to the cellular network, thereby requesting allocation of further UL radio resources to the communication device. An example of such scheduling request is the scheduling request 303.

Further, the selection may also involve that the communication device checks whether one or more conditions for sending a BSR, indicating an amount of UL data available for transmission by the communication device, are met. In response to one or more of such conditions being met, the communication device may selecting the active mode to send a UL transmission including the BSR.

At step 1330, the communication device receives control information from the cellular network, e.g., from the eNB 100. The communication device may receive the control information on a DL control channel between the node and the communication device, e.g., on a PDCCH of the LTE radio access technology. In some scenarios, the communication device may receive the control information in a broadcast message addressed to a plurality of communication devices, e.g., by a group C-RNTI assigned to the communication device and to other communication devices. An example of such control information is the above-mentioned hold grant.

At step 1340, in response to the control information of step 1330, the communication device temporarily disables its utilization of at least a part of the allocated UL radio resources in a certain time interval. In this part of the allocated UL radio resources and this time interval a retransmission by a further communication device may be expected. The disabling of the utilization may involve disabling the utilization for a configured time period, e.g., for a subframe or TTI, or for a configured number of subframes or TTIs. Such time period may be indicated by the control information of step 1230. In some scenarios, the control information of step 1230 may also indicate the UL radio resources of which the utilization is disabled by the communication device, e.g., in terms of RBs.

In some scenarios, after receiving the control information of step 1330 and disabling the utilization at step 1340, the communication device may receive further control information from the cellular network, e.g., from the eNB 100. Similar to the control information of step 1330, the communication device may receive the control information on the DL control channel between the node and the communication device, e.g., on the PDCCH of the LTE radio access technology. In some scenarios, the communication device may receive the further control information in a broadcast message addressed to a plurality of communication devices, e.g., by a group C-RNTI assigned to the communication device and to other communication devices.

At step 1340, the communication device re-enables its utilization of the allocated UL radio resources. This may be accomplished in response to expiry of the configured time period as indicated in the control information of step 1330. Further, this may be accomplished in response to the further control information of step 140. In the latter case, the further control information may also indicate the UL radio resources of which the utilization by the communication device is re-enabled, e.g., in terms of RBs. This indication of specific UL radio resources in the further control information also allows scenarios where not all disabled UL radio resources are re-enabled at the same time.

It is to be understood that the methods of FIGS. 12 and 13 may be combined, e.g., in a system including a node operating according to the method of FIG. 12 and a communication device operating according to the method of FIG. 13.

Figure 14:
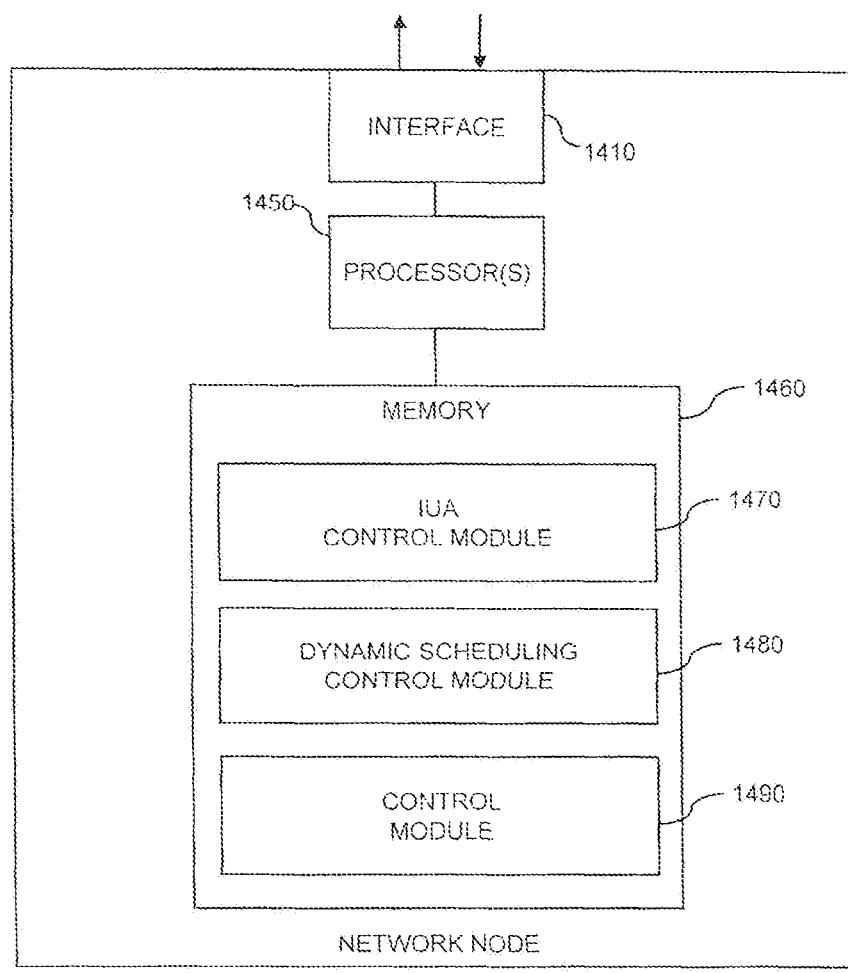
FIG. 14 schematically illustrates structures of a network node according to an embodiment of the invention.

FIG. 14 illustrates exemplary structures which may be used for implementing the above concepts in a node of a cellular network, e.g., the eNB 100.

As illustrated, the node may include an interface 1410 for connecting to communication devices, e.g., to the UEs 10, 10'. The interface 1410 may be utilized for sending the above-mentioned UL grants or for receiving UL transmissions. Further, the interface 1410 may be utilized sending the above-mentioned control information to the communication devices and/or for receiving control information from the communication devices. If the node is implemented as a base station, such as the eNB 100, the interface 1410 may be a radio interface for establishing radio links to the communication devices. If the node is implemented as a control node of a base station, such as an RNC of the UMTS radio access technology, the interface 1410 may be used for controlling the base station and for sending or receiving transmissions of the communication devices via the base station.

Further, the node includes one or more processors 1450 coupled to the interface 1410, and a memory 1460 coupled to the processor(s) 1450. The memory 1460 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 1460 includes suitably configured program code to be executed by the processor(s) 1450 so as to implement the above-described functionalities of the communication device. In particular, the memory 1460 may include various program code modules for causing the node to perform processes as described above, e.g., corresponding to the method steps of FIG. 13. As illustrated, the memory 1460 may include a IUA control module 1470 for implementing the above-described functionalities of determining a UL grant allocating UL resources in reoccurring time intervals and controlling the utilization of such UL grant by sending control information for temporarily disabling the utilization of the UL radio resources allocated by such grant. Further, the memory 1460 may include a dynamic scheduling module 1480 for implementing the above-described functionalities of dynamically sending UL grants with respect to a certain time interval. Further, the memory 1460 may include a control module 1490 for implementing generic control functionalities, e.g., controlling reporting or other signaling, such as detecting failed of transmissions and requesting retransmissions, e.g., as part of a HARQ process.

It is to be understood that the structures as illustrated in FIG. 14 are merely schematic and that the node may actually include further components which, for the sake of clarity, have not been illustrated, e.g., further interfaces or processors. Also, it is to be understood that the memory 1460 may include further types of program code modules, which have not been illustrated, e.g., program code modules for implementing known functionalities of an eNB or RNC. According to some embodiments, also a computer program may be provided for implementing functionalities of the node, e.g., in the form of a physical medium storing the program code and/or other data to be stored in the memory 1460 or by making the program code available for download or by streaming.

Figure 15:
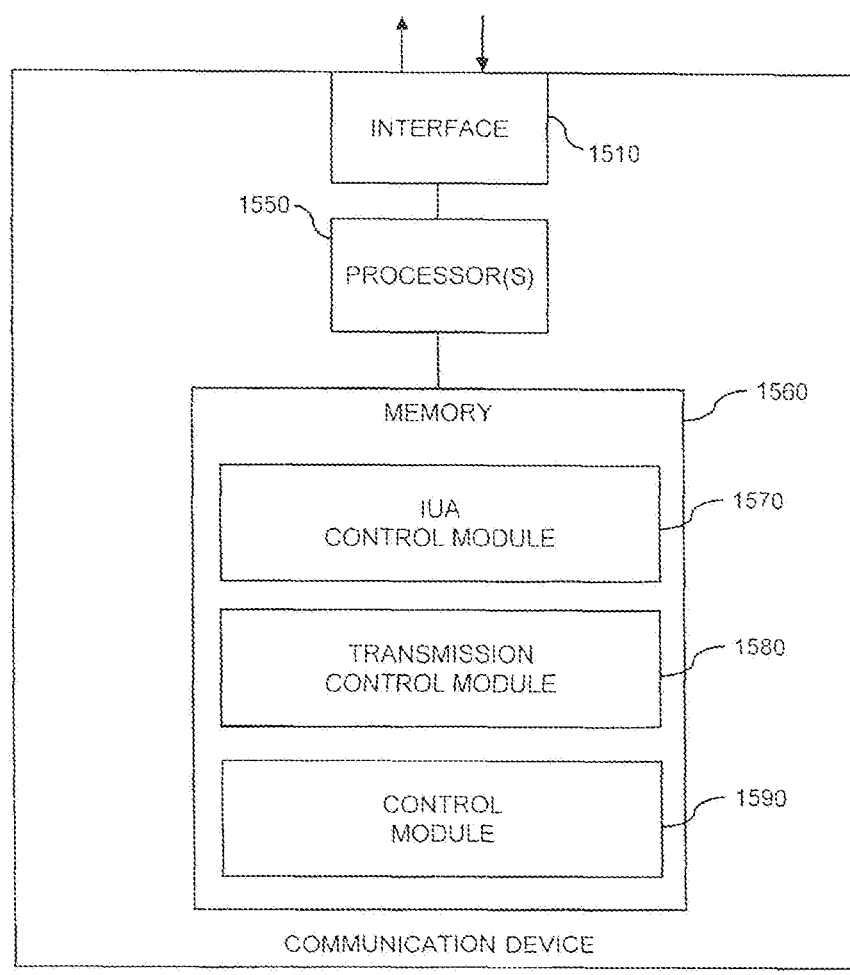
FIG. 15 schematically illustrates structures of a communication device according to an embodiment of the invention.

FIG. 15 illustrates exemplary structures which may be used for implementing the above concepts in a communication device, e.g., the UE 10.

As illustrated, the communication device may include an interface 1510 for connecting to a cellular network. For example, the interface may correspond to a radio interface as specified for the LTE radio access technology or based on another radio access technology, such as the UMTS radio access technology. The interface 1510 may be utilized for receiving the above-mentioned UL grants or for sending UL transmissions. Further, the interface 1510 may be utilized for receiving the above-mentioned control information from the cellular network or sending control information to the cellular network.

Further, the communication device includes one or more processors 1550 coupled to the interface 1510, and a memory 1560 coupled to the processor(s) 1550. The memory 1560 may include a ROM, e.g., a flash ROM, a RAM, e.g., a DRAM or SRAM, a mass storage, e.g., a hard disk or solid state disk, or the like. The memory 1560 includes suitably configured program code to be executed by the processor(s) 1550 so as to implement the above-described functionalities of the communication device. In particular, the memory 1560 may include various program code modules for causing the communication device to perform processes as described above, e.g., corresponding to the method steps of FIG. 13. As illustrated, the memory 1560 may include a IUA control module 1570 for implementing the above-described functionalities of conditionally utilizing the UL radio resources allocated in reoccurring time intervals and for temporarily disabling the utilization of the UL radio resources in response to control information from the cellular network. Further, the memory 1560 may include a transmission control module 1580 for implementing the above-described functionalities of controlling the sending of UL transmissions from the communication device, e.g., on the UL radio resources in the reoccurring time intervals. Further, the memory 1560 may include a control module 1590 for implementing generic control functionalities such as controlling reporting or other signaling, or controlling retransmissions, e.g., as part of a HARQ process.

It is to be understood that the structures as illustrated in FIG. 15 are merely schematic and that the communication device may actually include further components which, for the sake of clarity, have not been illustrated, e.g., further interfaces or processors. Also, it is to be understood that the memory 1560 may include further types of program code modules, which have not been illustrated, e.g., program code modules for implementing known functionalities of a UE. According to some embodiments, also a computer program may be provided for implementing functionalities of the communication device, e.g., in the form of a physical medium storing the program code and/or other data to be stored in the memory 1560 or by making the program code available for download or by streaming.

As can be seen, the concepts as described above may be used for achieving a low latency for UL transmissions by a communication device while at the same time providing a low risk of colliding UL transmissions. Specifically, by temporarily disabling the utilization of the UL radio resources allocated in reoccurring time intervals, retransmissions may be performed with low collision risk.

It is to be understood that the examples and embodiments as explained above are merely illustrative and susceptible to various modifications. For example, the concepts of collision avoidance as explained for the IUA-UL grant may also be applied in connection with various types of long lasting grants, e.g., SPS grants. Further, the illustrated nodes may be implemented by a single device or by a system of multiple devices. Moreover, it is to be understood that the above concepts may be implemented by using correspondingly designed software to be executed by one or more processors of an existing device, or by using dedicated device hardware.

The invention claimed is:

1. A method of controlling radio transmission in a cellular network, the method comprising:
    a node of the cellular network sending an uplink grant to a communication device, the uplink grant indicating uplink radio resources allocated to the communication device in reoccurring time intervals;
    for each of the reoccurring time intervals, the node selecting between:
        an active mode in which the network node receives uplink transmissions from the communication device on the allocated resources and provides hybrid automatic repeat request (HARQ) feedback to the communication device; and
        an inactive mode in which the network node does not receive uplink transmissions from the communication device on the allocated resources and refrains from sending HARQ feedback to the communication device; and
    in response to detecting a need for an uplink retransmission by a further communication device in at least a part of the allocated uplink radio resources in one of the time intervals, the node sending control information to the communication device, the control information temporarily disabling utilization of at least the part of the allocated uplink radio resources in at least the one of the time intervals by the communication device.

2. The method of claim 1, wherein the disabling of the utilization is for a configured time period.

3. The method of claim 2, wherein the control information indicates the time period.

4. The method of claim 1, wherein the control information indicates the uplink radio resources of which the utilization by the communication device is disabled.

5. The method of claim 1, further comprising the node sending further control information to the communication device, the further control information re- enabling the utilization of the allocated uplink radio resources by the communication device.

6. The method of claim 1, wherein the allocated uplink radio resources are overlapping with uplink radio resources which are allocated by a further uplink grant to the further communication device.

7. The method of claim 1, further comprising, in response to detecting no signals from the communication device in the allocated uplink radio resources, the node selecting the inactive mode.

8. A method of controlling radio transmission in a cellular network, the method comprising:
    a communication device of the cellular network receiving an uplink grant from the cellular network, the uplink grant indicating uplink radio resources allocated to the communication device in reoccurring time intervals;
    for each of the reoccurring time intervals, the communication device selecting between:
        an active mode in which the communication device transmits data on the allocated resources and receives hybrid automatic repeat request (HARQ) feedback to the communication device; and
        an inactive mode in which the communication device does not transmit data on the allocated uplink resources or receive HARQ feedback from the cellular network;
    after receiving the uplink grant, the communication device receiving control information from the cellular network; and in response to the control information, the communication device temporarily disabling utilization of at least a part of the allocated uplink radio resources in at least one of the time intervals by the communication device.

9. The method of claim 8, wherein the disabling of the utilization is for a configured time period.

10. The method of claim 9, wherein the control information indicates the time period.

11. The method of claim 8, wherein the control information indicates the uplink radio resources of which the utilization by the communication device is disabled.

12. The method of claim 8, further comprising the communication device receiving further control information from the cellular network, the further control information re-enabling utilization of the allocated uplink radio resources by the communication device.

13. The method of claim 8, wherein the allocated uplink radio resources are overlapping with uplink radio resources which are allocated by a further uplink grant to a further communication device.

14. The method of claim 8, further comprising:
for each of the time intervals, the communication device checking whether uplink data is available for transmission by the communication device; and
in response to uplink data being available for transmission, the communication device selecting the active mode to perform an uplink transmission comprising at least a part of the uplink data.

15. The method of claim 8, further comprising:
for each of the time intervals, the communication device checking whether one or more conditions for sending a buffer status report are met; and
in response to one or more of the conditions being met, the communication device selecting the active mode to send an uplink transmission comprising the buffer status report, the buffer status report indicating an amount of uplink data available for transmission by the communication device.

16. A node for a cellular network, the node comprising: an interface for connecting to a communication device and a further communication device; and processing circuitry configured to:
send an uplink grant to a communication device via the interface, the uplink
grant indicating uplink radio resources allocated to the communication device in reoccurring time intervals;
for each of the reoccurring time intervals, the node selecting between:
an active mode in which the network node receives uplink transmissions from the
communication device on the allocated resources and provides hybrid automatic repeat request (HARQ) feedback to the communication device; and
an inactive mode in which the network node does not receive uplink transmissions from the communication device on the allocated resources and refrains from sending HARQ feedback to the communication device; and
in response to detecting a need for an uplink retransmission by the further communication device in at least a part of the allocated uplink radio resources in one of the time intervals, send control information to the communication device via the interface, the control information temporarily disabling utilization of at least the part of the allocated uplink radio resources in at least the one of the time intervals by the communication device.

17. The node of claim 16, wherein the disabling of the utilization is for a configured time period.

18. The node of claim 17, wherein the control information indicates the time period.

19. The node of claim 16, wherein the control information indicates the uplink radio resources of which the utilization by the communication device is disabled.

20. The node of claim 16, wherein the processing circuitry is configured to send further control information to the communication device via the interface, the further control information re-enabling the utilization of the allocated uplink radio resources by the communication device.

21. The node of claim 16, wherein the allocated uplink radio resources are overlapping with uplink radio resources which are allocated by a further uplink grant to the further communication device.

22. The node of claim 16, wherein the processing circuitry is configured to select the inactive mode in response to detecting no signals from the communication device in the allocated uplink radio resources.

23. A communication device, comprising: an interface for connecting to a cellular network; and processing circuitry configured to:
receive, via the interface, an uplink grant from the cellular network, the uplink grant indicating uplink radio resources allocated to the communication device in reoccurring time intervals;
for each of the reoccurring time intervals, the communication device selecting between:
an active mode in which the communication device transmits data on the allocated resources and receives hybrid automatic repeat request (HARQ) feedback to the communication device; and
an inactive mode in which the communication device does not transmit data on the allocated uplink resources or receive HARQ feedback from the cellular network;
after receiving the uplink grant, receive control information from the cellular network via the interface; and
in response to the control information, temporarily disable utilization of at least a part of the allocated uplink radio resources in at least one of the time intervals by the communication device.

24. The communication device of claim 23, wherein the disabling of the utilization is for a configured time period.

25. The communication device of claim 24, wherein the control information indicates the time period.

26. The communication device of claim 23, wherein the control information indicates the uplink radio resources of which the utilization by the communication device is disabled.

27. The communication device of claim 23, wherein the processing circuitry is configured to receive further control information from the cellular network via the interface, the further control information re-enabling utilization of the allocated uplink radio resources by the communication device.

28. The communication device of claim 23, wherein the allocated uplink radio resources are overlapping with uplink radio resources which are allocated by a further uplink grant to a further communication device.

29. The communication device of claim 23, wherein the processing circuitry is configured to:
for each of the time intervals, check whether uplink data is available for transmission by the communication device; and in response to uplink data being available for transmission, select the active mode to perform an uplink transmission comprising at least a part of the uplink data.

30. The communication device of claim 23, wherein the processing circuitry is configured to:
for each of the time intervals, check whether one or more conditions for sending a buffer status report are met; and
in response to one or more of the conditions being met, select the active mode to send an uplink transmission comprising the buffer status report, the buffer status report indicating an amount of uplink data available for transmission by the communication device.

31. A non-transitory computer readable recording medium storing a computer program product for controlling radio transmission in a cellular network, the computer program product comprising software instructions which, when run on processing circuitry of a node of the cellular network, causes the node to:
send an uplink grant to a communication device, the uplink grant indicating uplink radio resources allocated to the communication device in reoccurring time intervals;
for each of the reoccurring time intervals, the node selecting between:
an active mode in which the network node receives uplink transmissions from the communication device on the allocated resources and provides hybrid automatic repeat request feedback (HARQ) to the communication device; and
an inactive mode in which the network node does not receive uplink transmissions from the communication device on the allocated resources and refrains from sending HARQ feedback to the communication device; and
in response to detecting a need for an uplink retransmission by a further communication device in at least a part of the allocated uplink radio resources in one of the time intervals, send control information to the communication device, the control information temporarily disabling utilization of at least the part of the allocated uplink radio resources in at least the one of the time intervals by the communication device.

32. A non-transitory computer readable recording medium storing a computer program product for controlling radio transmission in a cellular network, the computer program product comprising software instructions which, when run on processing circuitry of a communication device of the cellular network, causes the communication device to:
receive an uplink grant from the cellular network, the uplink grant indicating uplink radio resources allocated to the communication device in reoccurring time intervals;
for each of the reoccurring time intervals, the communication device selecting between:
an active mode in which the communication device transmits data on the allocated resources and receives hybrid automatic repeat request (HARQ) feedback to the communication device; and
an inactive mode in which the communication device does not transmit data on the allocated uplink resources or receive HARQ feedback from the cellular network after receiving the uplink grant, receive control information from the cellular network; and
after receiving the uplink grant, receive control information from the cellular network;
and in response to the control information, temporarily disable utilization of at least a part of the allocated uplink radio resources in at least one of the time intervals by the communication device.

* * * * *